United States Patent
Rowland

(10) Patent No.: US 9,285,071 B1
(45) Date of Patent: Mar. 15, 2016

(54) SUPPORT ASSEMBLY FOR CONDENSER

(71) Applicant: Jay F. Rowland, Johns Creek, GA (US)

(72) Inventor: Jay F. Rowland, Johns Creek, GA (US)

(73) Assignee: J.F.R. Enterprises, Inc., Johns Creek, GA (US)

(*) Notice: Subject to any disclaimer, the term of this patent is extended or adjusted under 35 U.S.C. 154(b) by 241 days.

(21) Appl. No.: 13/738,296

(22) Filed: Jan. 10, 2013

Related U.S. Application Data

(60) Provisional application No. 61/585,563, filed on Jan. 11, 2012.

(51) Int. Cl.
*F16M 9/00* (2006.01)
*F16M 13/02* (2006.01)
*E04G 23/00* (2006.01)

(52) U.S. Cl.
CPC .............. *F16M 13/02* (2013.01); *E04G 23/00* (2013.01)

(58) Field of Classification Search
CPC ................................ F16M 13/02; E04G 23/00
USPC ....................................... 52/27; 248/346, 678
See application file for complete search history.

(56) References Cited

U.S. PATENT DOCUMENTS

| | | | |
|---|---|---|---|
| 2,268,451 A | * | 12/1941 | Hull ............................... 454/201 |
| 2,644,321 A | * | 7/1953 | Borgerd ........................... 62/263 |
| 2,935,366 A | | 5/1960 | Cahn |
| 2,988,181 A | | 6/1961 | Darrey |
| 3,220,711 A | | 11/1965 | Leppard et al. |
| 3,611,743 A | * | 10/1971 | Manganaro ...................... 62/263 |
| 3,722,845 A | | 3/1973 | Unger |
| 3,932,899 A | | 1/1976 | Brady et al. |
| 4,122,916 A | | 10/1978 | Strobel |
| 4,483,155 A | | 11/1984 | Stiles |
| 1,558,472 A | | 12/1985 | Fromme et al. |
| 4,989,826 A | | 2/1991 | Johnston, Jr. |
| 5,188,333 A | | 2/1993 | Schumacher et al. |
| 5,308,037 A | | 5/1994 | Gonzalez |
| 5,407,171 A | | 4/1995 | Gonzalez |
| 5,582,026 A | | 12/1996 | Barto, Sr. |
| 5,649,391 A | | 7/1997 | Layne |
| 5,855,102 A | | 1/1999 | Chang |
| 5,950,980 A | | 9/1999 | Folmar |
| 6,111,197 A | | 8/2000 | Layne |
| 6,336,338 B1 | | 1/2002 | Koren |
| 6,419,096 B1 | | 7/2002 | Shepherd |
| RE37,981 E | | 2/2003 | Layne |

(Continued)

FOREIGN PATENT DOCUMENTS

EP 1890091 2/2008
JP 08005103 12/1996

*Primary Examiner* — Charles A Fox
*Assistant Examiner* — James Buckle, Jr.
(74) *Attorney, Agent, or Firm* — Eric W. Cernyar

(57) ABSTRACT

A system for supporting a condenser above a ground surface generally includes a beam that elevates the condenser above the ground surface, the beam incorporating or coupled to a wall sleeve on one end and a frame on the other end and adapted to allow a line set from the condenser to pass through at least a portion of an interior channel or passageway of the beam into the wall sleeve. In use, the beam is joined to a sleeve and placed in a hole in the building structure, such as a foundation wall, and secured to resist rotational force. The beam is joined to a frame, the condenser is placed on the frame, and the line set is run through the beam and sleeve. Thereby, the condenser becomes elevated above the ground on the condenser supporting system. The beam may be cantilevered.

14 Claims, 19 Drawing Sheets

(56) References Cited

U.S. PATENT DOCUMENTS

| | | |
|---|---|---|
| 6,655,648 B2 | 12/2003 | Harris |
| 6,969,799 B2 | 11/2005 | Snyder |
| 6,998,530 B2 | 2/2006 | Snyder |
| 7,137,268 B2 | 11/2006 | Cook et al. |
| D608,917 S | 1/2010 | Ward et al. |
| 7,798,465 B1 | 9/2010 | Meverden |
| 7,891,635 B2 | 2/2011 | Rowland |
| 8,136,782 B2 | 3/2012 | Rowland |
| 2004/0004193 A1 | 1/2004 | Nilson et al. |
| 2006/0144071 A1 | 7/2006 | Rowland |
| 2007/0034760 A1 | 2/2007 | Moore |
| 2009/0107162 A1 | 4/2009 | Su et al. |
| 2010/0320360 A1 | 12/2010 | McLeod |

* cited by examiner

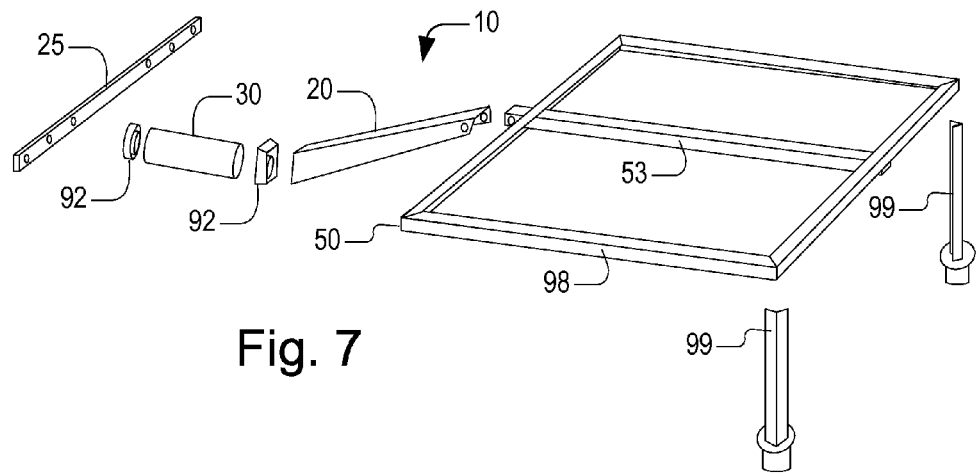
Fig. 7
Fig. 8
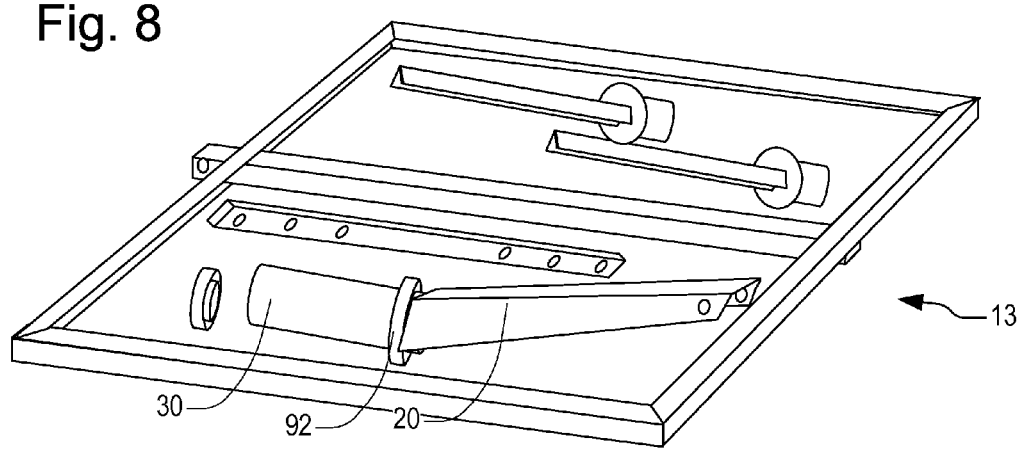

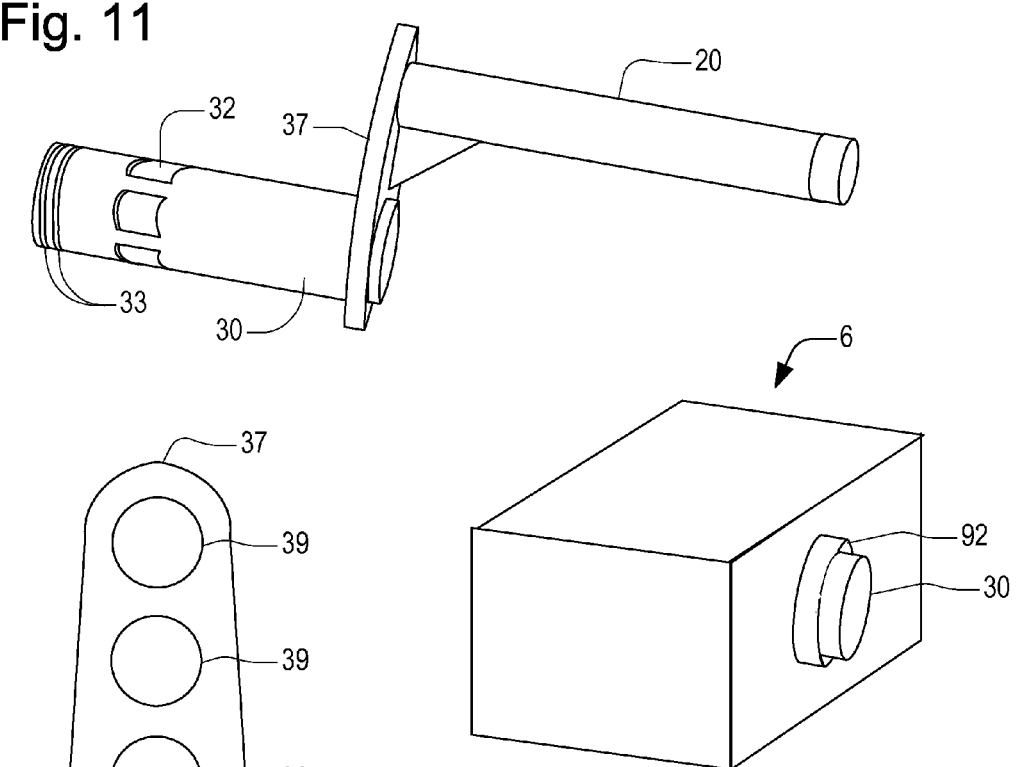
Fig. 11
Fig. 12
Fig. 13
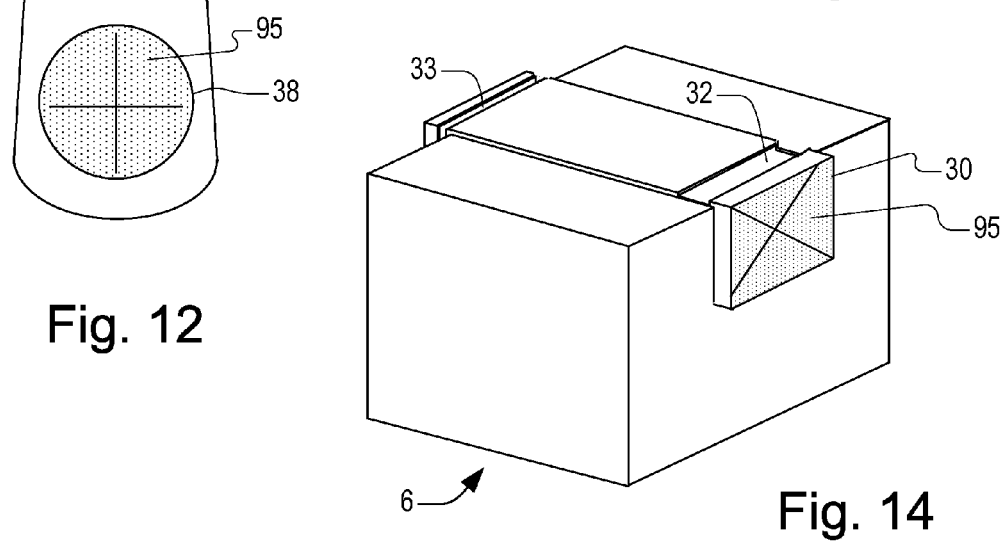
Fig. 14

SUPPORT ASSEMBLY FOR CONDENSER

RELATED APPLICATIONS

This application claims priority to my U.S. provisional patent application Ser. No. 61/585,563, filed Jan. 11, 2012, entitled "Cantilevered Support for a Condenser," which is herein incorporated by reference and referred to herein as "the provisional application."

TECHNICAL FIELD

The present disclosure generally relates to systems and methods for elevating an equipment unit, and more particularly relates to a beam assembly for elevating a condensing unit, and associated methods for elevating a condensing unit using a beam support.

BACKGROUND

When HVAC technicians place condensing units outside buildings, they typically install the units on equipment supports such as pads, stands, or brackets. Anti-vibration pads may be placed between those supports and the condensing unit for quieter operation. A refrigerant line set and electrical wiring is threaded from the condenser through a hole in the building, sometimes with a line set sleeve in the wall to protect the line set and aid the threading process. When two units are installed at the same site, their line sets often share the same hole through the wall, while the two units should be properly spaced 24" to 36" from each other, depending upon applicable code. As a final step, anti-theft structures are increasingly installed around the condensing units in order to protect the metal inside.

Each of the above steps is largely distinct from one another and served by separate components. As such, the combination of those components is not cost-effective or synergistic, and certain of the components present other shortcomings. For example, equipment pads tend to settle over time or allow debris to impair performance, and the vast majority of equipment supports are not meant to be theft deterrents. Lightweight pads may simply be removed from the premises along with the condensing unit.

SUMMARY

A support is provided that utilizes the building structure to serve multiple functions. In one aspect, the support suspends the condenser above grade and ensures code clearances. In another aspect, it acts as a line set sleeve. In other aspects, it secures equipment against hurricane-force winds and acts as a theft deterrent.

A system for supporting a condensing unit above a ground surface generally includes a beam that elevates the condensing unit above the ground surface, the beam incorporating or coupled to a line set sleeve on one end and a frame on the other end and adapted to allow a line set from the condensing unit to pass through both at least a portion of the exterior of the beam and at least a portion of an interior channel or passageway of the beam into the line set sleeve. The beam may be cantilevered. Other systems, devices, methods, features, and advantages of the disclosed systems and methods for elevating a condensing unit will be apparent or will become apparent to one with skill in the art upon examination of the following figures and detailed description. All such additional systems, devices, methods, features, and advantages are intended to be included within the description and to be protected by the accompanying claims.

BRIEF DESCRIPTION OF THE DRAWINGS

The present disclosure may be better understood with reference to the following figures. Corresponding reference numerals designate corresponding parts throughout the figures, and components in the figures are not necessarily to scale.

It will be appreciated that the drawings are for illustrative purposes and that the invention is not limited to the illustrated embodiment. For clarity and in order to emphasize certain features, not all of the drawings depict all of the features that might be included with the depicted embodiment. The invention also encompasses embodiments that combine features illustrated in multiple different drawings; embodiments that omit, modify, or replace some of the features depicted; and embodiments that include features not illustrated in the drawings. Therefore, it should be understood that there is no restrictive one-to-one correspondence between any given embodiment of the invention and any of the drawings.

Also, many modifications may be made to adapt or modify a depicted embodiment without departing from the objective, spirit and scope of the present invention. Therefore, it should be understood that, unless otherwise specified, this invention is not to be limited to the specific details shown and described herein, and all such modifications are intended to be within the scope of the claims made herein.

Figure 1:
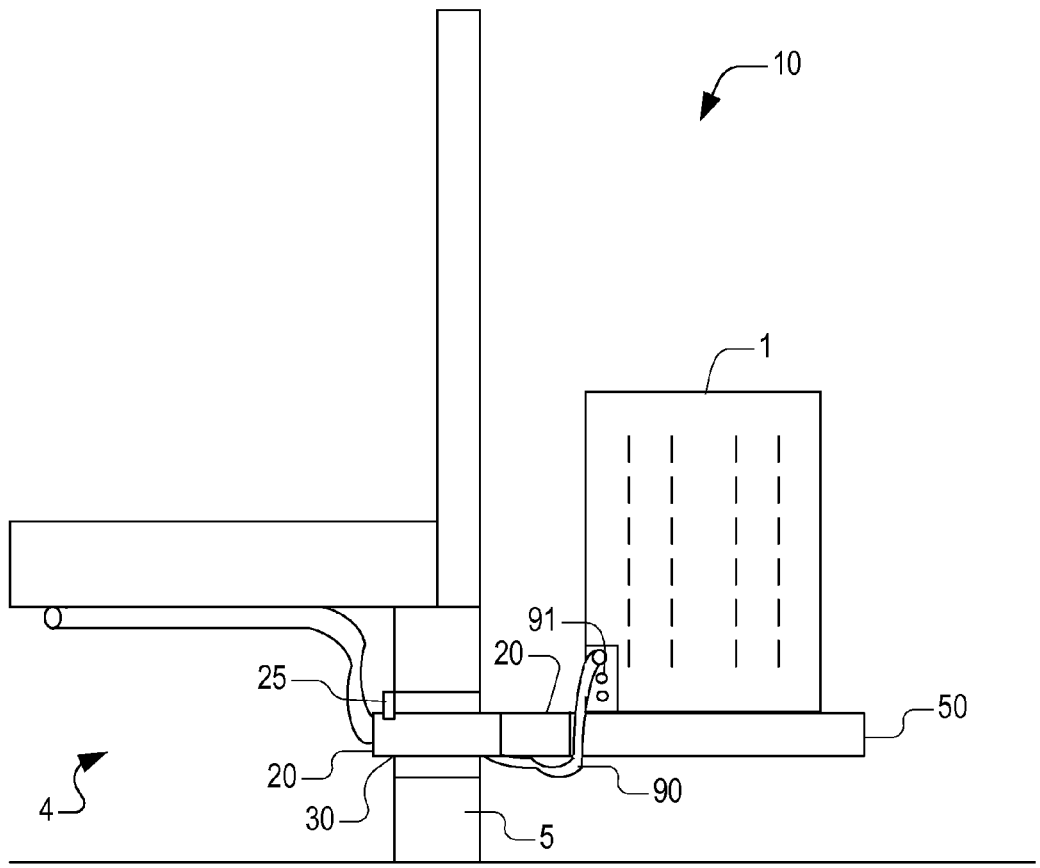

FIG. 1 illustrates one embodiment of a condenser installation according to the present invention.

Figure 2:
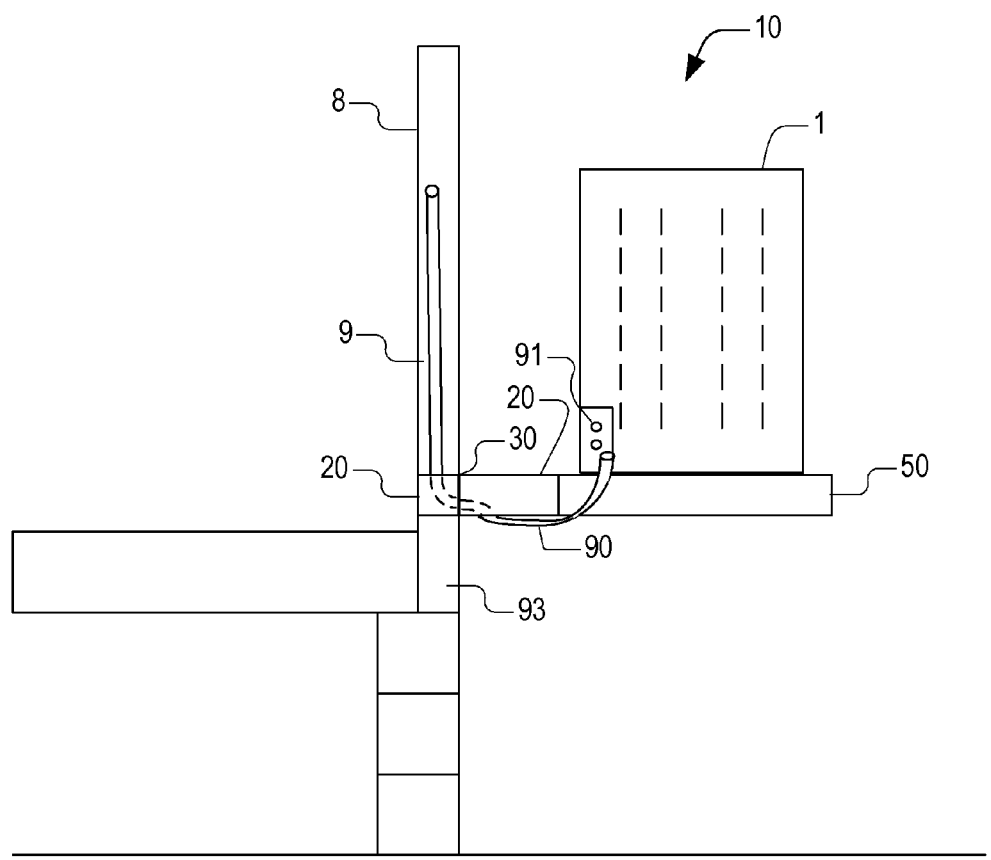

FIG. 2 illustrates another embodiment of a condenser installation according to the present invention.

Figure 3:
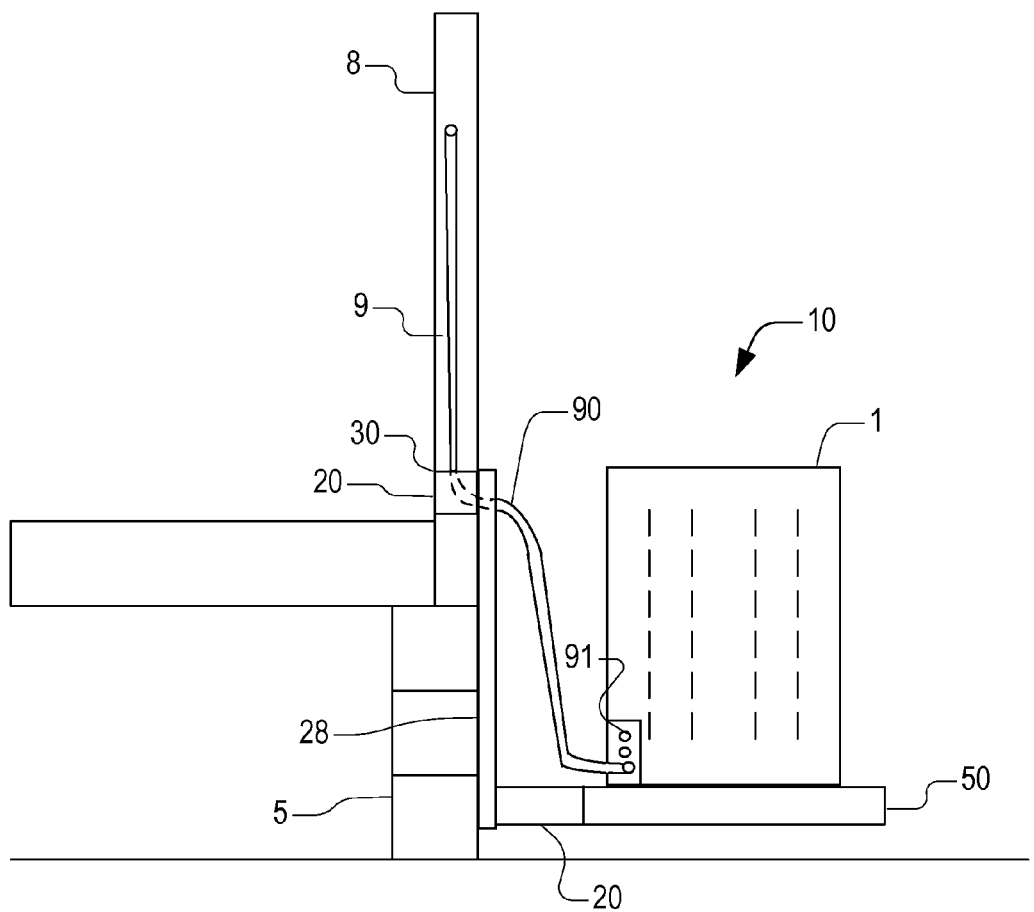

FIG. 3 illustrates another configuration of the condenser installation of FIG. 2.

Figure 4:
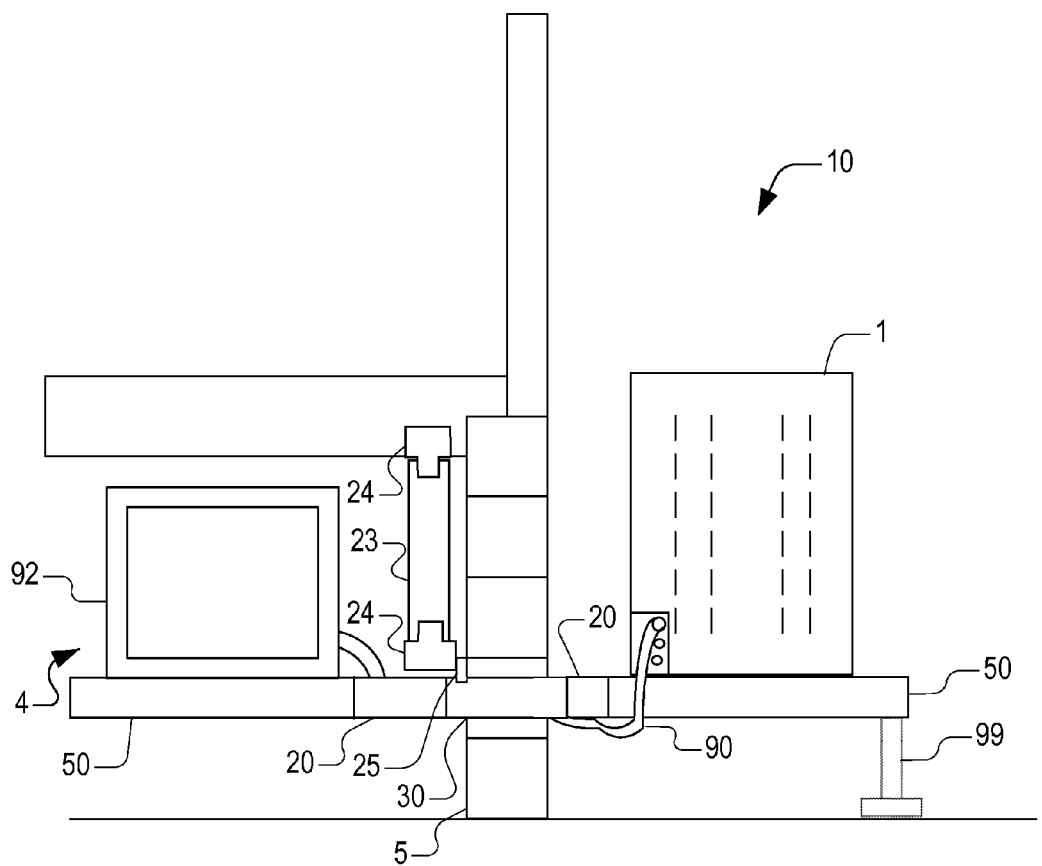

FIG. 4 is an illustrative embodiment of an air handler and condenser installation utilizing the invention.

Figure 5:
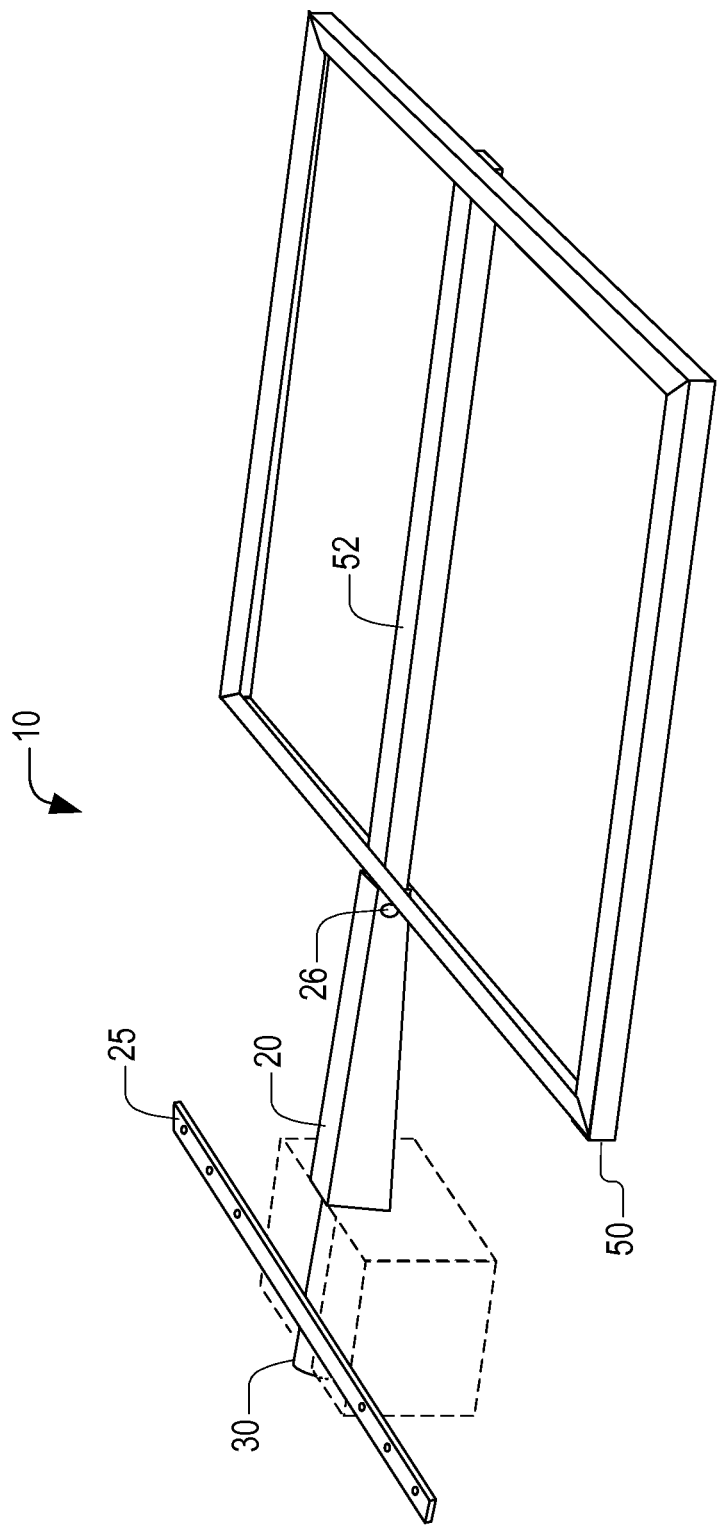

FIG. 5 is a perspective view of a condenser supporting assembly.

Figure 6:
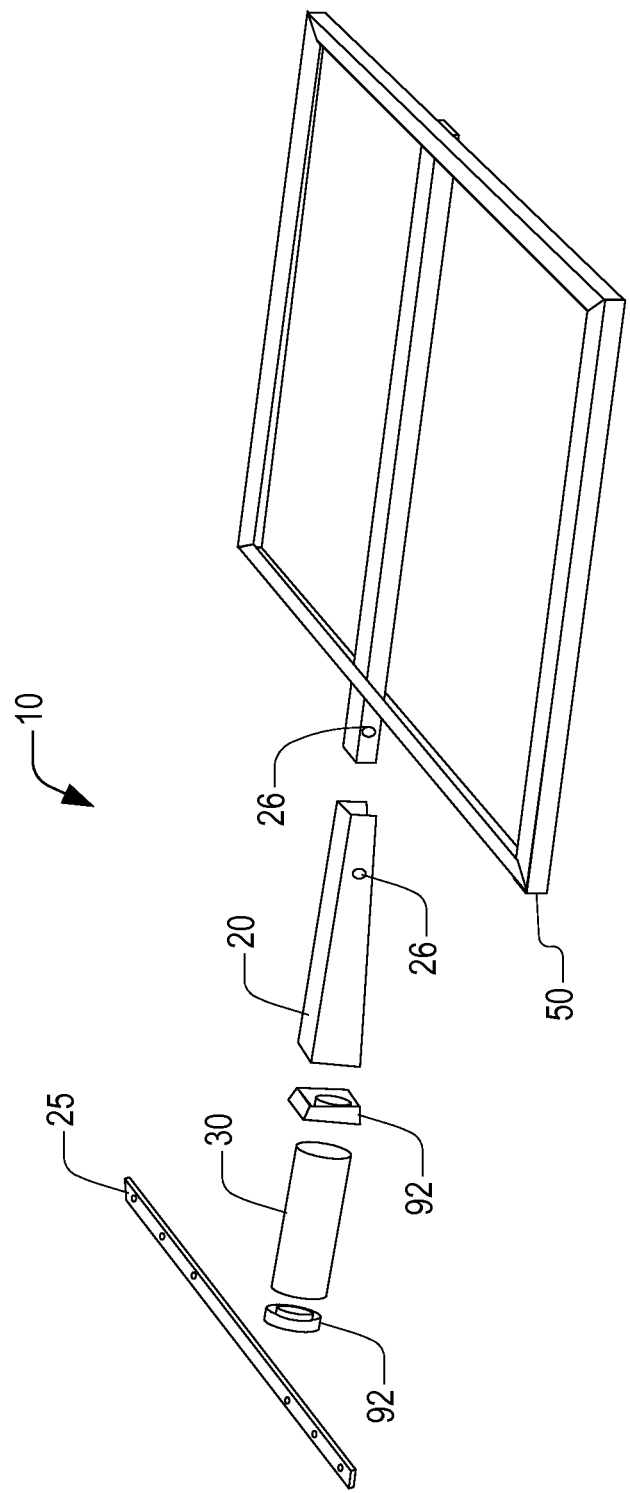

FIG. 6 is an exploded perspective view of a condenser supporting assembly.

FIG. 7 is an exploded perspective view of a condenser supporting assembly providing increased clearance from grade.

FIG. 8 is a condenser supporting assembly kit.

Figure 9:
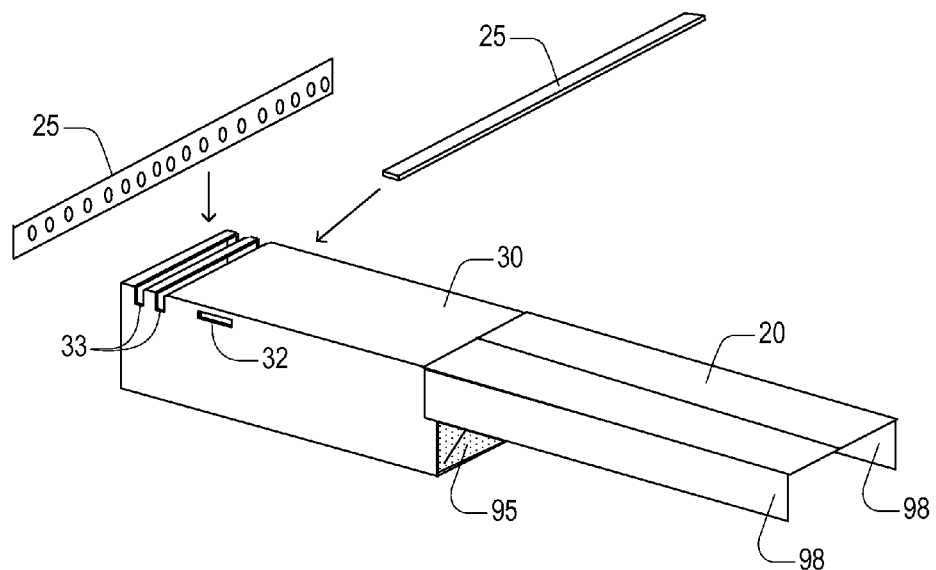

FIG. 9 is a perspective view of a square line set sleeve with angle iron beam.

Figure 10:
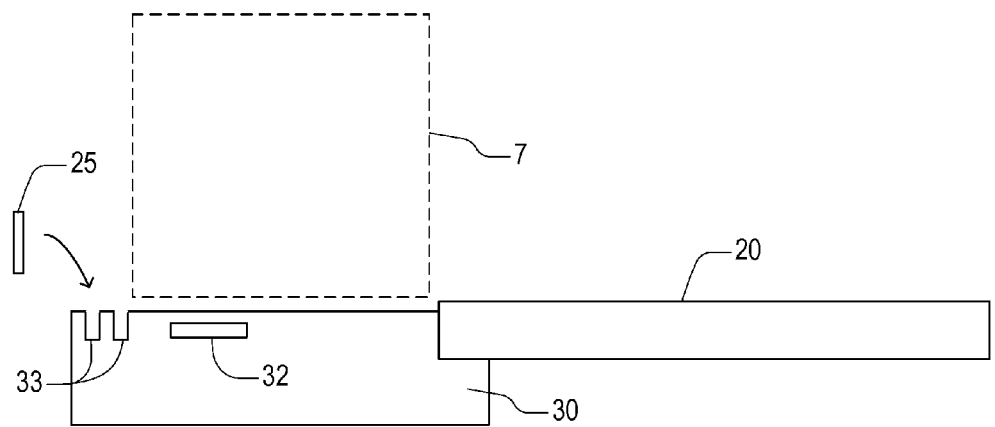

FIG. 10 is a side view of a square line set sleeve with angle iron beam.

FIG. 11 is a perspective view of a round line set sleeve with an offset beam.

FIG. 12 is a front view of an offset beam plate that allows options for installing beams at various distances from the sleeve.

FIG. 13 is a perspective view of a round sleeve formed within a block.

FIG. 14 is a perspective view of a square sleeve formed within a block.

Figure 15:
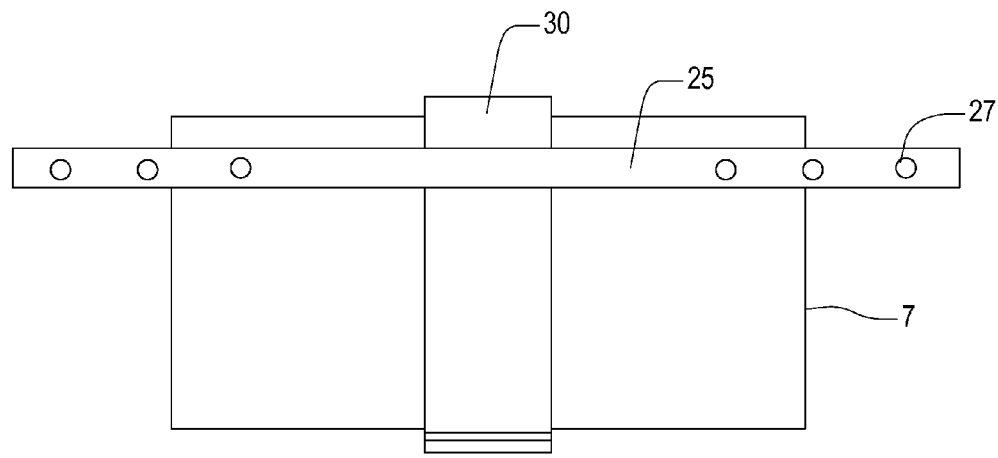

FIG. 15 is a top view of a sleeve installed through block, with a horizontal bar on top.

Figure 16:
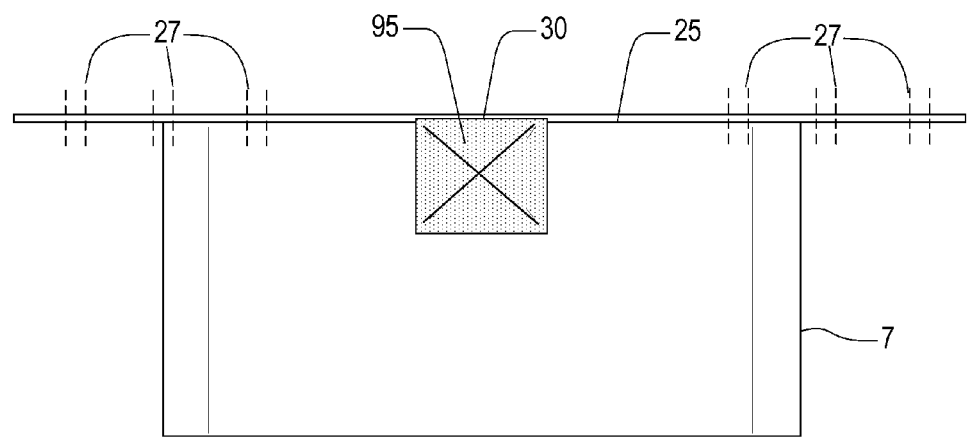

FIG. 16 is a front view of a square sleeve installed through block, with a horizontal bar on top.

Figure 17:
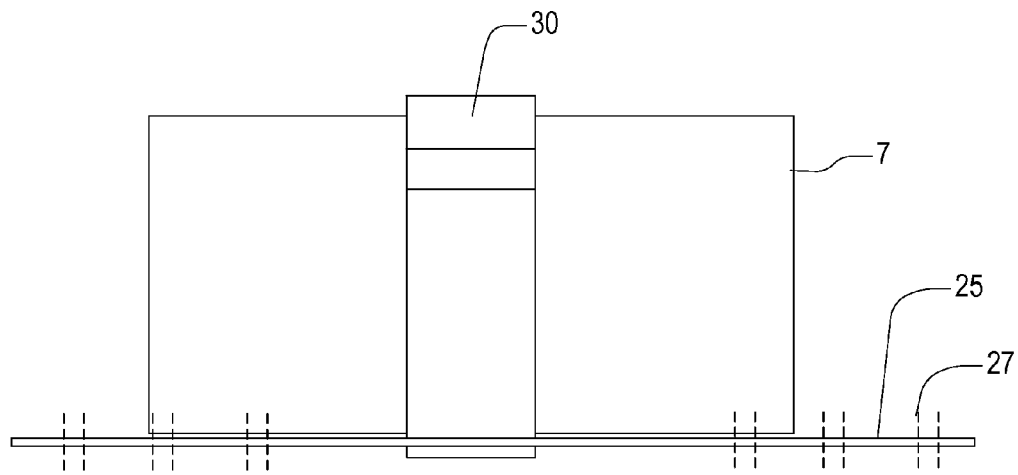

FIG. 17 is a top view of a sleeve installed through block, with a bar behind the block.

Figure 18:
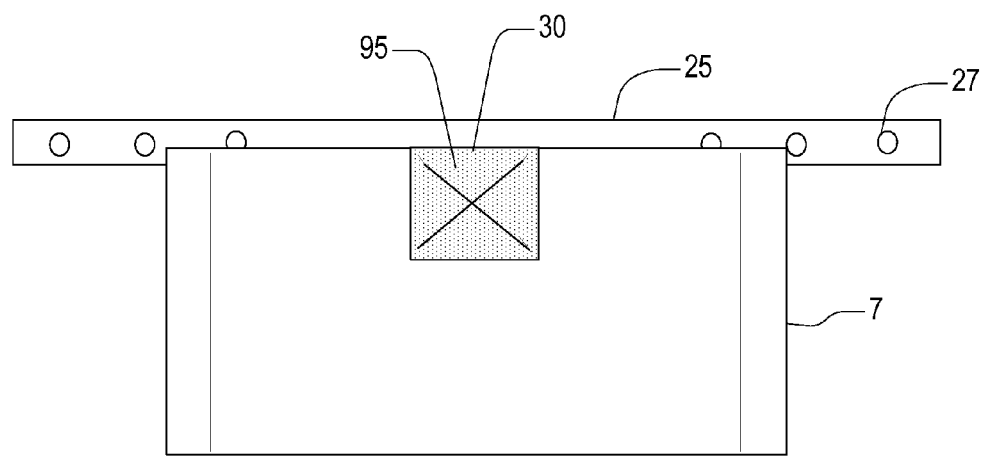

FIG. 18 is a front view of a square sleeve installed through block, with a bar behind the block.

Figure 19:
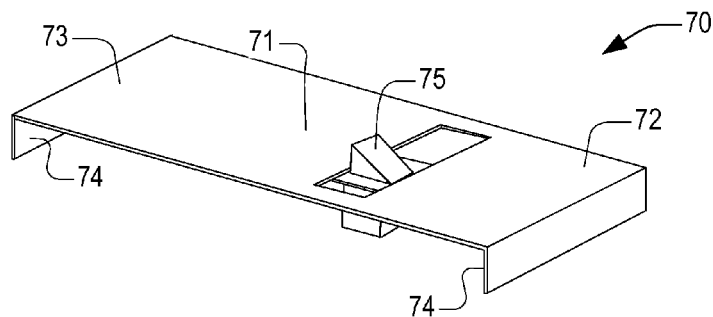

FIG. 19 is a perspective view of a locking plate.

Figure 20:
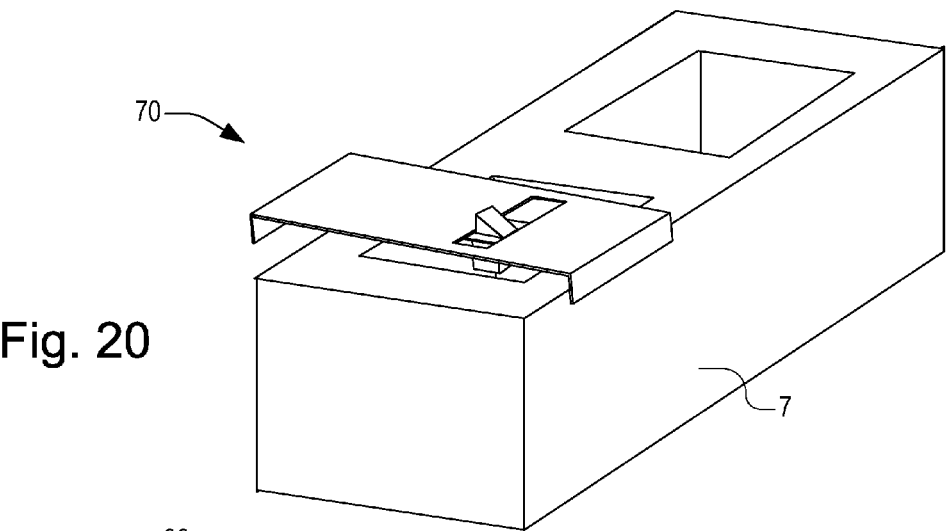

FIG. 20 is an illustrative embodiment of a locking plate relative to its placement in a cinder block.

Figure 21:
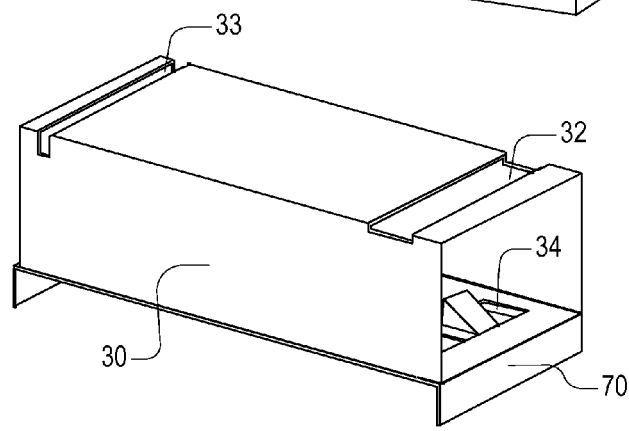

FIG. 21 is an illustrative embodiment of a square sleeve relative to its placement on a locking plate.

Figure 22:
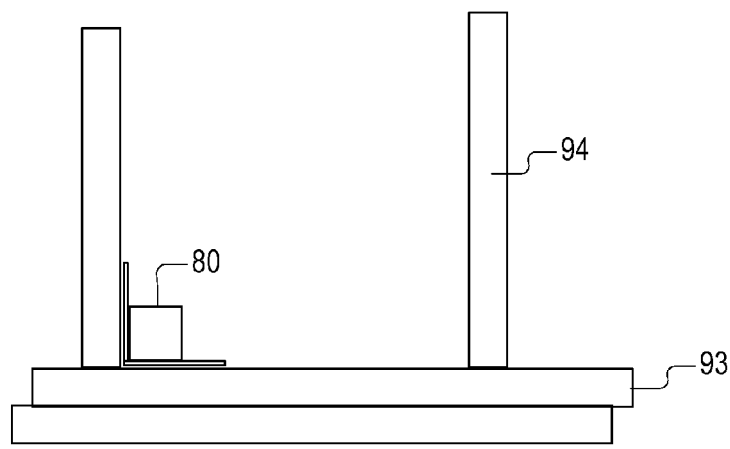

FIG. 22 is a front view of a sleeve relative to framing members.

Figure 23:
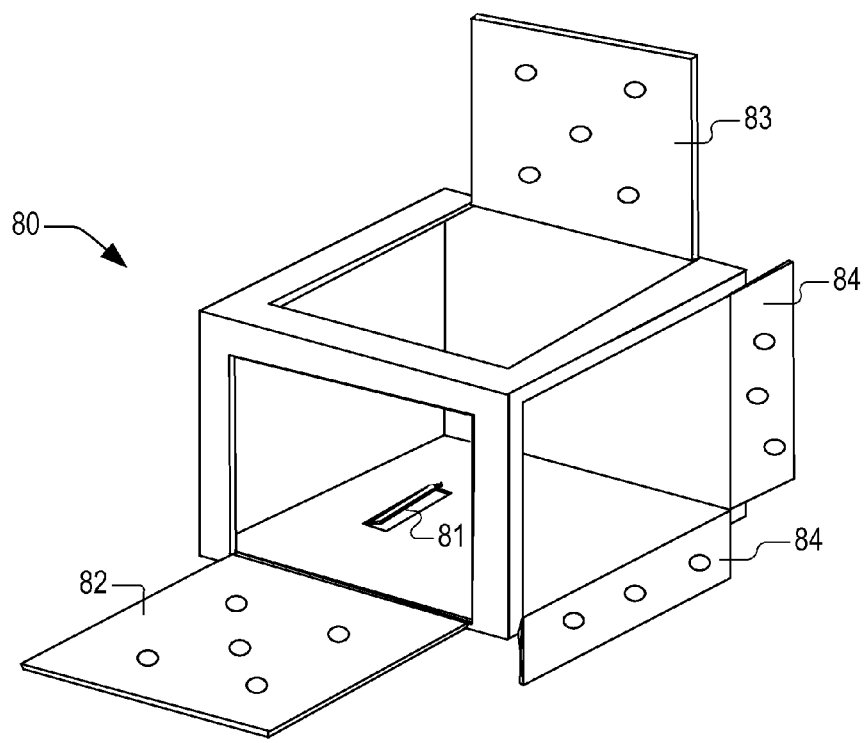

FIG. 23 is a rear perspective view of a sleeve for framing members.

Figure 24:
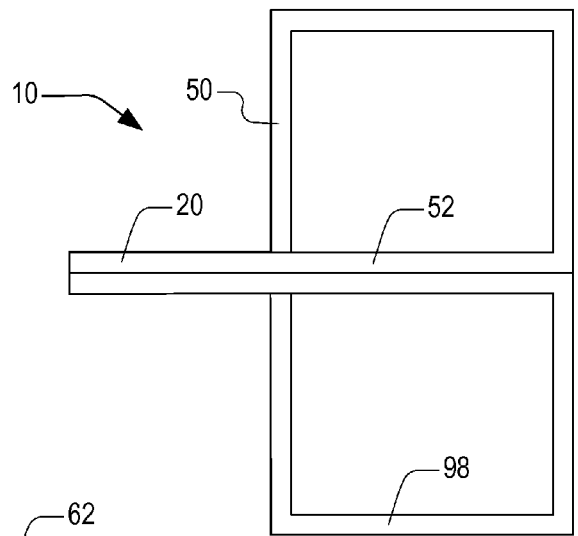

FIG. 24 is a top view of a rectangular frame with center beam.

Figure 25:
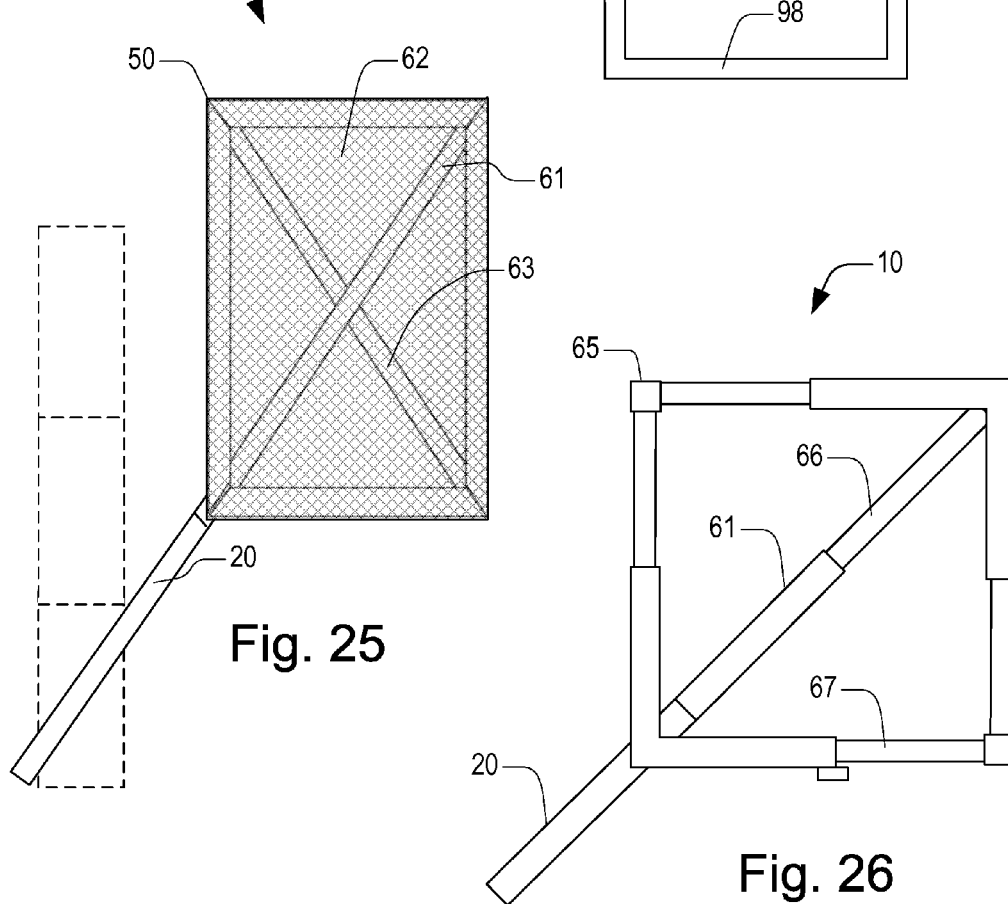

FIG. 25 is a top view of a frame with diagonal beam and grating.

Figure 26:
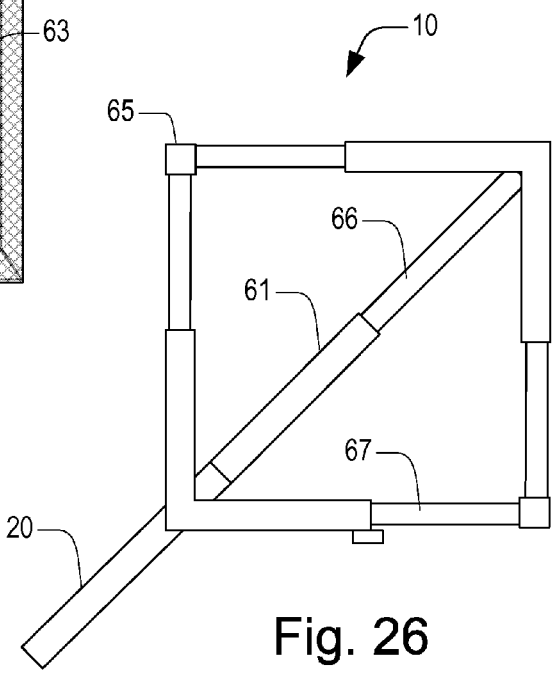

FIG. 26 is a top view of an adjustable frame.

Figure 27:
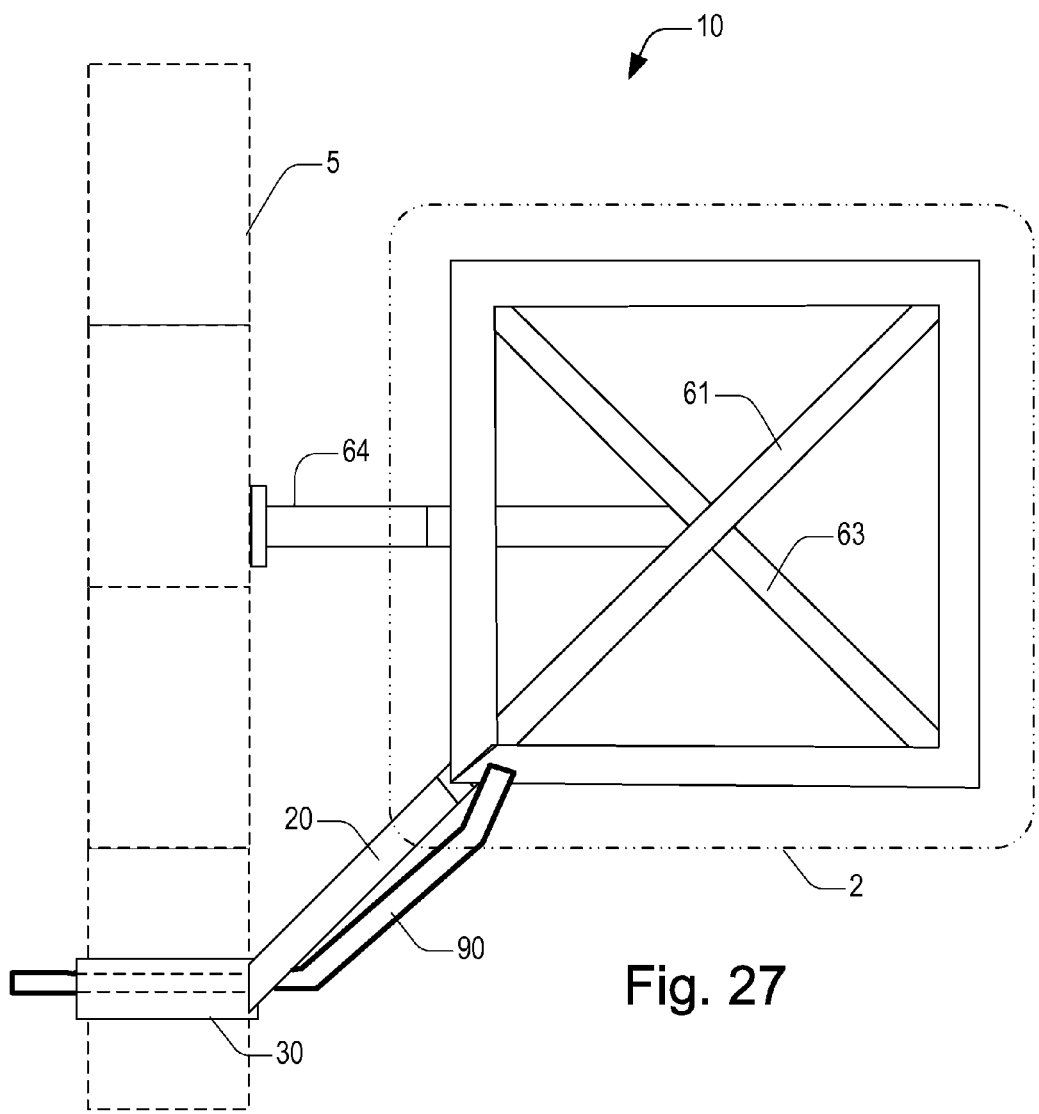

FIG. 27 is a top view of a frame with diagonal beam that turns perpendicular to the wall to enter the wall.

Figure 28:
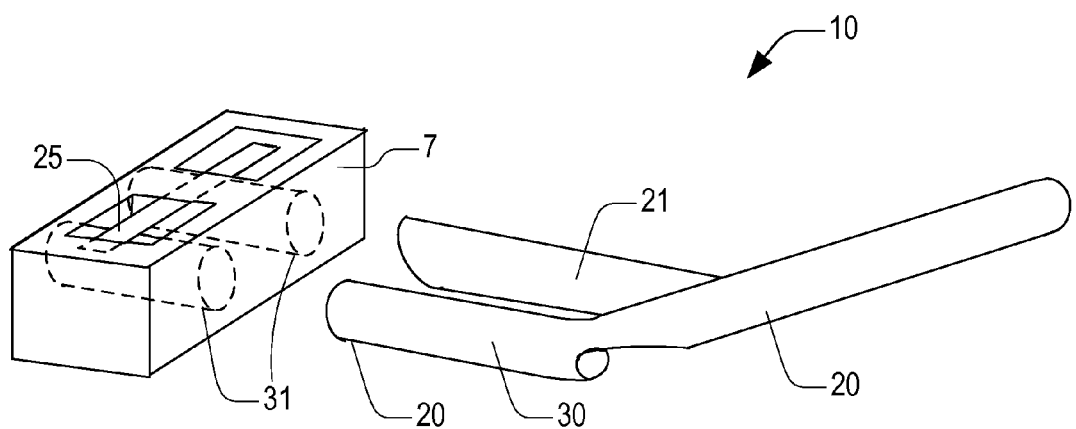

FIG. 28 is an illustrative embodiment of a diagonal beam, incorporating a line set sleeve, with additional supporting beam and a double sleeve cast in a concrete block.

Figure 29:
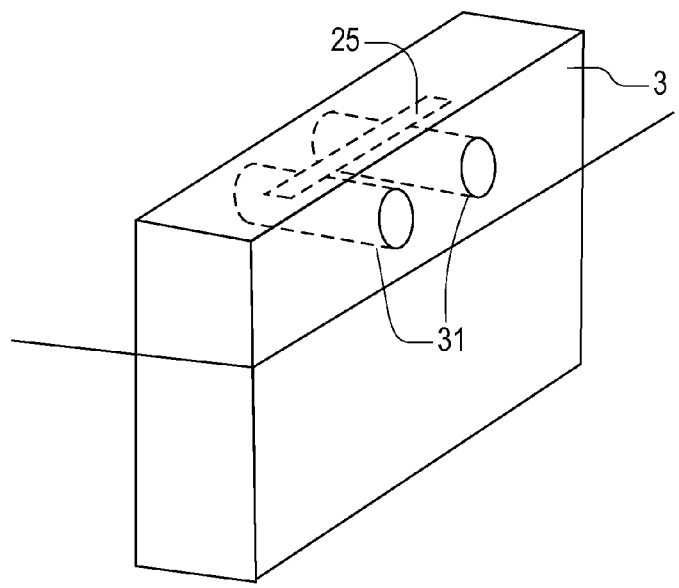

FIG. 29 is a perspective view of a double sleeve cast in a monolithic foundation.

Figure 30:
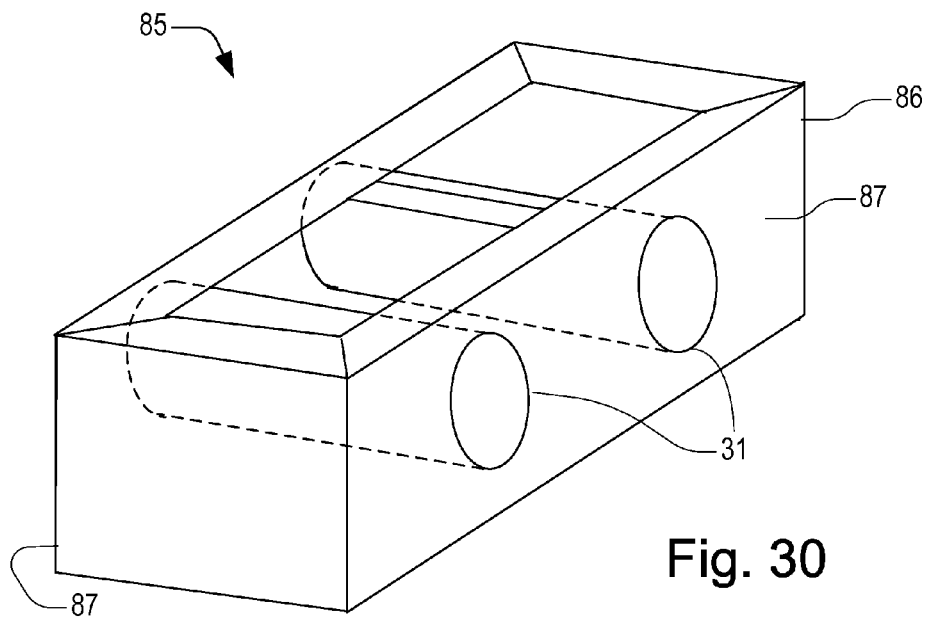

FIG. 30 is a perspective view of a double sleeve formed as part of a metal block.

Figure 31:
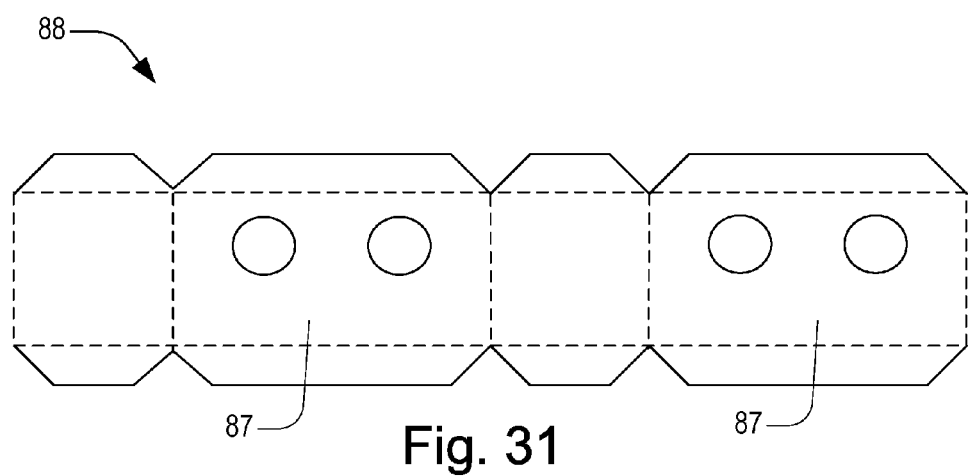

FIG. 31 is a top view of a template for forming a metal block for masonry.

Figure 32:
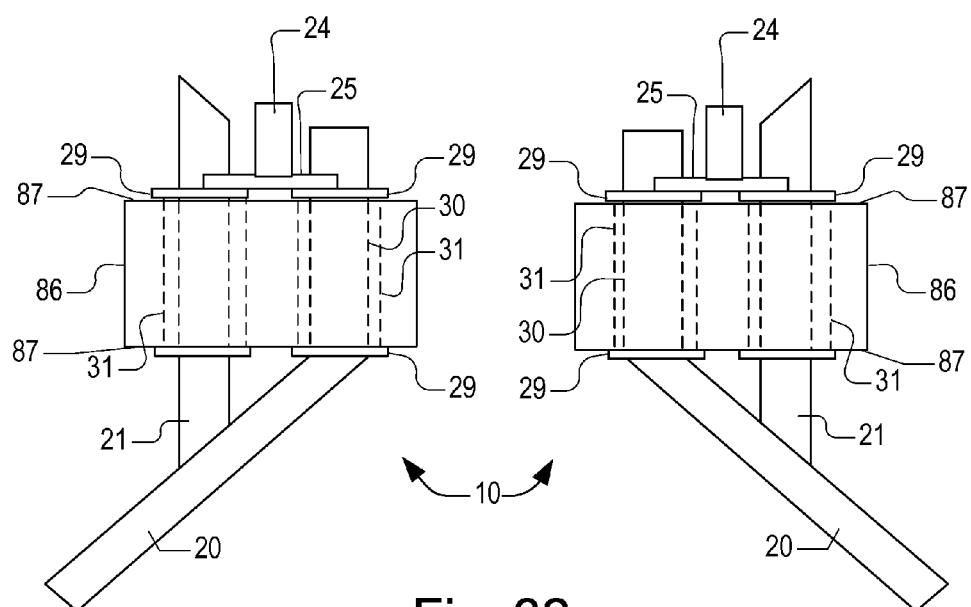

FIG. 32 is a top view of left and right reversible dual beam assemblies.

Figure 33:
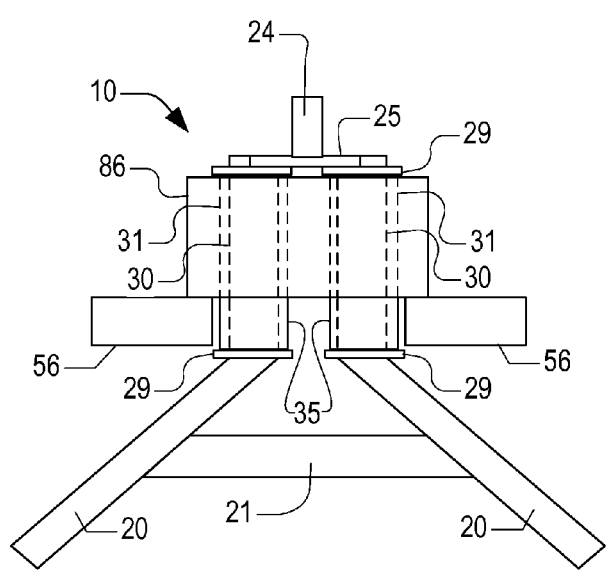

FIG. 33 is a top view of a two-unit condenser support assembly.

Figure 34:
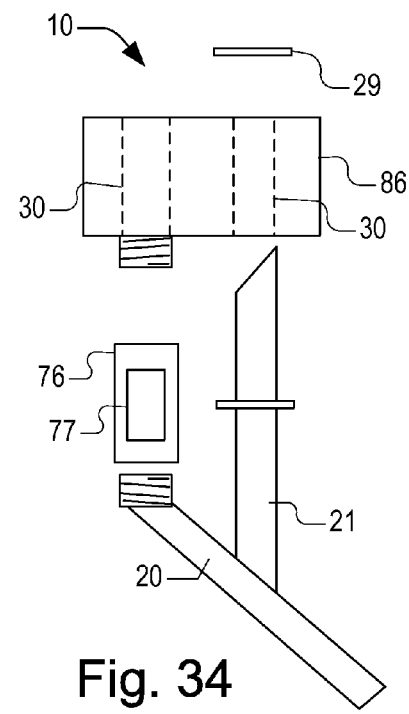

FIG. 34 is a bottom view of a threaded support assembly.

Figure 35:
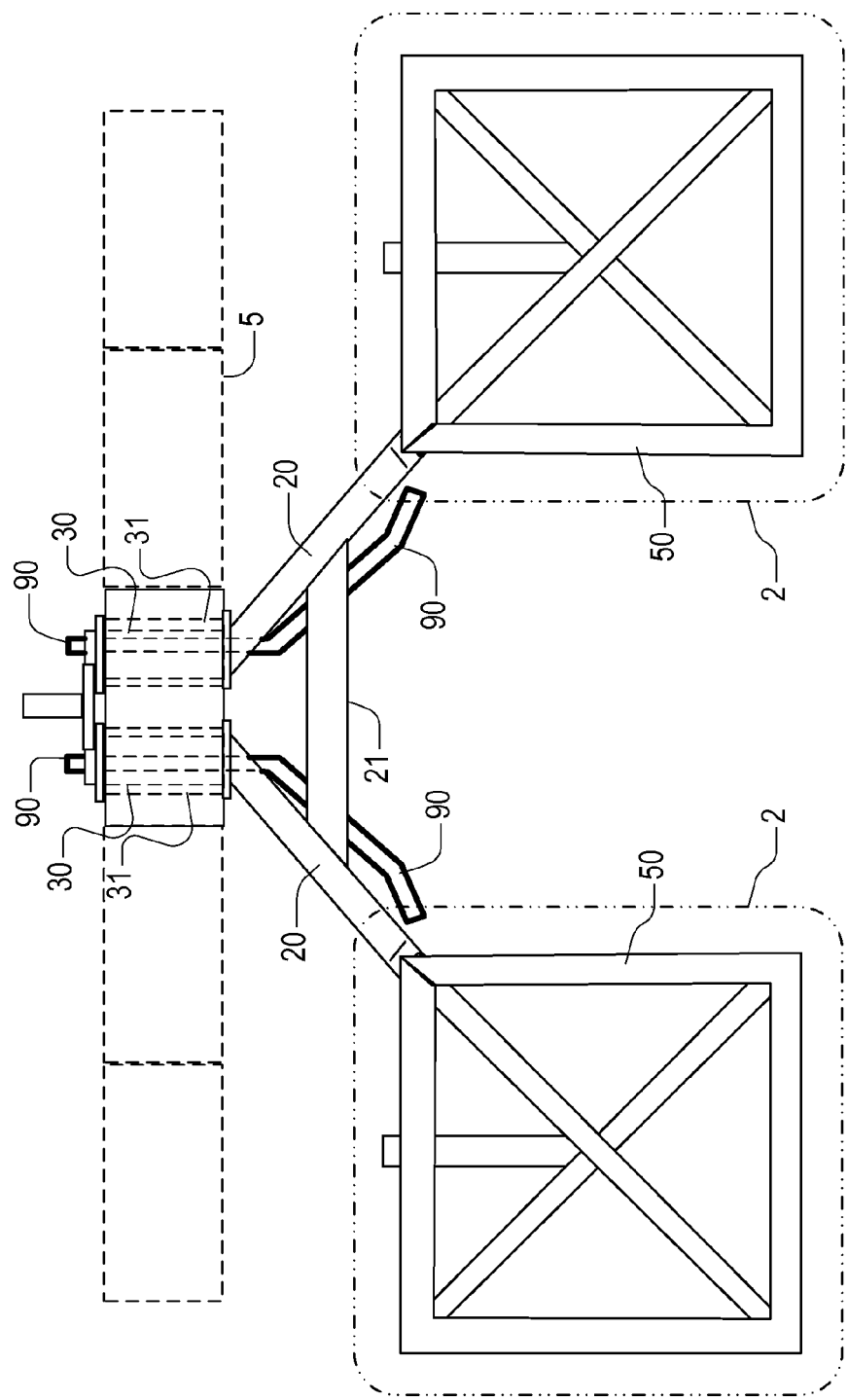

FIG. 35 is a top view of a two-unit installation and clearances.

DETAILED DESCRIPTION

Described below are embodiments and configurations of systems and methods for elevating an equipment unit. Such systems and methods may comprise a beam and frame support for an air conditioning condensing unit or other appliance. The beam and frame support generally includes a beam that elevates the equipment unit above the ground surface, the beam incorporating or mated with or otherwise coupled to a line set sleeve and adapted to allow a line set from the equipment unit to pass through at least a portion of an interior channel or passageway of the beam into the wall sleeve. Coupling makes the sleeve one with the beam. The beam is adapted to support a frame that elevates the equipment unit above the ground surface. In use, the sleeve is placed in a hole in the building structure, such as a structural wall or foundation, a beam is coupled to the sleeve if it is not already one with the sleeve, the sleeve and beam are secured to resist rotational force, a frame is mated to the beam, the equipment unit is placed on the frame, and the line set is run through the sleeve. To run through the sleeve, the line set must necessarily run through at least a portion of the beam. Thereby, the equipment unit becomes elevated above the ground on the beam and frame support. The beam may be cantilevered.

"Beam" may refer to a beam assembly or to a main beam member. Sometimes the portion of the beam from the wall or foundation to the frame is referred to as the neck of the beam. The neck may include an offset beam member or plate and its connection to the sleeve and the beam connecting the sleeve or offset member to the frame. Beam assembly members may include a sleeve, a secondary sleeve, an offset beam or plate, a main beam, a supporting beam member, a frame member that ties into the main beam member, and the connections between these members. This variety of beam members allows the invention to provide universal fit for condensers of different makes and placement of condensers wherever desired around a building, even without regard to the location of the air handler. Technicians may avoid windows and place condensers away from occupied areas of the building, typically close to grade.

Many different embodiments and configurations are contemplated. Each embodiment includes a beam upon which the condensing unit may be mounted that is inserted into a wall or foundation (e.g., of a house or building) and is configured to allow the condenser line set (typically two refrigerant lines), wiring, and condensate diversion to pass through at least a portion of the interior of the beam, and spaces the condensing unit sufficiently far away from the wall, typically at least several inches, to meet the equipment manufacturer's guidelines. The gap between the condensing unit and the wall ranges from at least a few inches to more than a foot, allowing for increased airflow to the unit.

Other embodiments include a combination and/or selection of some of, but not all of, the following features.

The beam may be formed as one piece with a hollow wall sleeve that is inserted into a wall or foundation (e.g., of a house or building), or the sleeve may accept the beam, like the hitch receiver on a vehicle, or the beam may mate around the end of the sleeve. The sleeve and main beam member may be offset by an offset beam member or plate. The sleeve, beam, plate, or frame may be round, square, or U-shaped, and made of hollow bar, channel stock, angle iron, polymers, composites, or even wood. The thickness or gauge of material used may vary with structural requirements. The sleeve may have one or more openings that allow the line set to exit in a variety of directions into the building.

The beam may have an adjustable length (e.g., via a telescoping action between inner and outer members). A frame may be attached to the beam to support the equipment, or the beam and frame may be formed as one piece. The beam or frame may be mounted in the wall or foundation (e.g., a cinder block or concrete form) or on a wood framing member (e.g., wooden floor joist, wall studs, or sill plate). The beam may be cantilevered.

Vibration dampening measures reduce transmission of vibration from the support to the building structure. The sleeve, beam, or frame may be mounted into a specialized cinder block or metal block that provides enhanced structural support and vibration-dampening features. The beam may include a supporting beam. The frame also may be supported by adjustable legs or feet that extend to the ground.

The portion of the sleeve and beam through which the line set passes may contain weatherizing material such as foam or rubber that allows the line set in and keeps rain and other weather out.

FIG. 1 illustrates one embodiment of a condenser support assembly and system 10 in which a condensing unit 1 is installed on a cantilevered condenser support. Per recent codes, the unit 1 is to be suspended 2" to 6" above grade. The unit 1 sits on a beam 20 and frame 50 that attach to a sleeve 30 in the foundation wall 5. In some embodiments, the frame 50 is unitary with the beam 20 and sleeve 30. The beam 20 and frame 50 may be any size suitable for use under a condensing unit 1. Frame 50 sizes, like equipment pad sizes, typically range from approximately 16×36 inches to 60×67 inches for a single unit 1. Frame 50 dimensions will typically be a few inches smaller than pad sizes. However, the beam 20 and frame 50 are not limited to these dimensional ranges and may be any size necessary to accommodate any condensing unit 1. The beam 20 and frame 50 may be steel, aluminum, polymers, composite materials, or wood.

The sleeve 30 and beam 20 are stabilized against rotational forces via a flat, horizontal stabilizing bar 25 attached behind the block wall 5 of a crawl space or basement 4, and the bar 25 also impedes removal of the beam 20 from outside of the structure. The line set 90 runs from the refrigerant stubs 91 at or near the corner of the unit 1 through at least a portion of the main beam member 20 and the sleeve 30 into the structure, and the sleeve 30 may contain insulation 95. Sleeves 30 typically are about 2" to 5" inside diameter. Each condenser 1 typically has two metal refrigerant stubs at the outside housing of the unit, such that the line set may be attached, via soldering, brazing, or a similar method, without entering the unit.

Current industry practice for mounting units 1 to the outer walls of structures is to mechanically attach (using screws) two steel or aluminum brackets through the exterior finish of the building and into a support such as studs or cinder block. Cross bars between brackets may add strength. Brackets vary in gauge and strength, but often are able to hold anywhere from several hundred pounds to over a thousand pounds. Units 1 may be attached to the brackets using hurricane straps. Two factors have led to increased use of brackets. One is the growing popularity of mini-splits. The other is the need for homebuilders to make use of lots that have significant slope, where maintaining level pads is difficult. Window units may also use brackets, but those installations typically have different requirements, typically constrained by proximity to and alignment with windows, limited choices of placement, and a relatively fixed and short range of installation variance. Brackets may allow use of a shorter line set 90. The danger with conventional brackets is that they may give way, with the line set 90 severing and the unit 1 crashing down.

Line sets 90 may pass into a building through block walls 5, monolithic walls or foundations 3, stick-framed walls 8, or other construction materials. A line set sleeve 30 may be installed during new construction or as a retrofit. For new construction, the sleeve 30 and condenser support assembly and system 10 may be formed as an integral part of the structure. For retrofit, the contractor will drill a hole (if one does not already exist) and put the condenser support assembly and system 10 in place.

FIG. 2 illustrates another embodiment of a condenser support assembly and system 10, similar to that of FIG. 1, wherein the beam 20 and frame 50 attach to a sleeve 30 in stick-built or metal framing. The location of such attachment may be on a sill plate 93 or on another horizontal or upright framing member. The sleeve 30 and beam 20 are stabilized against rotational forces via steel bracing against the framing members inside the wall structure. As shown in FIG. 23, a secondary sleeve 80 may accept the sleeve 30 and beam 20, or that secondary sleeve 80 may be made part of a one-piece beam 20. The line set 90 runs from the refrigerant stubs 91 at or near the corner of the unit 1 through at least a portion of the main beam member 20 and the sleeve 30 into the structure, and then the line set 90 will typically turn upward and run within the wall cavity 9 and then to the air handler. In the case of a mini-split installation, the line set 90 may go through an interior wall to reach an air handler in an occupied space. The sleeve 30 may contain insulation 95.

FIG. 3 illustrates another configuration of the condenser support assembly and system 10 in FIG. 2, wherein the beam 20 and frame 50 attach to a sleeve 30 in stick-built or metal framing via an offset beam member 28. The offset allows the condensing unit 1 to be installed closer to grade for operational, safety, and maintenance reasons. Conversely, the offset beam member 28 may extend upward to raise the unit 1 higher, as needed. The offset beam member 28 may be pipe, tube, channel, plate, or other material, and it may be of set length or adjustable length. The sleeve 30, offset beam member 28, and beam 20 may be formed as one piece or assembled from individual pieces in the field. Further, the offset beam member may be an offset plate 37 as in FIG. 12. The support assembly and system 10 is stabilized against rotational forces via steel bracing against the framing members inside the wall structure 8. Additionally, mechanical attachments may be run through the offset beam member 28 and into the foundation wall 5. Anti-vibration material may be included at any point where the support assembly and system 10 touches the structure. The line set 90 runs from the refrigerant stubs 91 at or near the corner of the unit 1 through at least a portion of the offset beam member 28 and the sleeve 30 into the structure.

FIG. 4 illustrates another configuration of the condenser support assembly and system 10 of FIG. 1, with a few changes. Legs 99 are installed under the outer corners of the support frame 50. The unit's 1 load is mostly and predominantly borne by the cantilevered support provided by the beam 20, but the legs 99 allow the frame 50 to act in place of the horizontal stabilizing bar 25 to resist rotational forces. If theft is not a concern, the flat bar 25 may be omitted from behind the block wall 5. With said bar in place, use of strong legs 99 may provide additional grounding for an anti-theft cage (not shown).

Legs 99 may be preferred when the frame 50 is sized to hold two or more equipment units 1. Otherwise, the installer may need to install an additional beam to support the weight.

Another optional stabilization and anti-theft measure is shown in the form of a 2×4 23, held in place by tie downs 24, running from the bar 25 and sleeve 30 to a joist in the building's substructure. Other materials, such as strut or metal rod, may be used to the same end, and anti-vibration materials should be incorporated.

The condenser support assembly and system 10 is paired with a beam or frame 50 used to support an air handler 92 on the other side of the wall. In a split system, a condenser 1 is paired with an air handler 92. However, a piece of equipment may be installed on the inside of a structure without the condenser 1 using a support assembly and system 10 on the outside. Likewise, the air handler 92 and the condenser 1 are typically treated as separate units that, although they work together, may be different brands or technology. The beam 20, frame 50, sleeve 30, and other embodiments described in this specification, in all of their various forms, may be employed to support equipment inside or under the structure.

FIG. 5 depicts a configuration of a condenser support assembly and system 10 in which a sleeve 30 and beam 20 are installed during construction of a cinder block wall 5, typically referred to as an 8" hollow CMU (concrete masonry unit) wall. The flat stabilizing bar 25 attaches to the top of the sleeve 30 and rests between courses of cinder block. The bar 25 is mortared in place. The hole for the sleeve 30 may be drilled or pre-formed. In this configuration, the beam 20 and center beam 52 of the frame 50 align with the center of the condensing unit 1 (not shown) that will be placed on top.

FIG. 6 is an exploded view of the support assembly and system 10 of FIG. 5, which may be put together in the field or pre-assembled in a factory. On either end of the round sleeve 30, rubber grommets 92 or other material provide anti-vibration qualities and protect the edges of the cinder block. Vibration dampening may be achieved via rubber, foam, springs, or a number of other isolation measures, including combinations of materials. The vibration dampening material may encompass the entire sleeve 30, flat bar 25, and/or other parts of the support assembly and system 10 that contact the structure, or the vibration dampening material may be more discrete in its contact, such as the grommets 92.

In keeping with the forces at work on the anti-vibration material, with downward pressure at the front of the wall or foundation and upward pressure at the rear, the anti-vibration material may be thicker at those pressure points. The concrete block at those pressure points may be further protected with metal angle or other force-spreading material, which may constitute a secondary sleeve 30.

The neck or beam 20 extends from the sleeve 30 to the frame 50, and a line set 90 is able to pass under the beam 20 and into the sleeve 30. For anti-theft reasons, the beam 20 may be permanently attached or connected using locking mechanisms. In a preferred embodiment, the beam 20 is welded to the sleeve 30, and the beam 20 has holes 26 that align with holes 26 in the frame 50, so that a barbell lock will hold the frame 50 in place. In this way, multiple frame 50 sizes may fit the same standard beam 20.

Although the sleeve 30 and corresponding portion of the beam 20 should have sufficient inner size to allow the line set 90 to pass, the remainder of the beam 20 and frame 50 may be of a different size. Structurally, to carry the weight and forces expected, the beam 20 and frame 50 do not need to be as large as the sleeve 30.

Sleeves 30 currently used in the industry typically are 2½" to 5" in diameter. They are often made of plastic and have a flange on one end that presses up against the wall and allows for mechanical attachment. Some sleeves 30 are inclined or have foam gaskets 95 in order to prevent water from entering the structure. They have no structural purpose, but simply line, cover, and improve the look of the line set holes.

FIG. 7 is an exploded view of a support assembly and system 10 with a cantilevered neck beam 20 that inclines in order to provide greater clearance from grade. Such a configuration allows line sets 90 to be run through foundation slabs on grade or, in other instances, precludes the need for snow stands or heat pump risers. The frame 50 is constructed of square tube 53 as the central support 52, with angle iron 98 around the perimeter. For anti-theft purposes, the contractor would screw through the base of the condensing unit 1 into the central square tube 53, and thieves would be denied easy access to the screws. For further protection, a steel cage may be built from the frame 50, beam 20, and legs 99.

Rather than an inclined beam 20, additional height may be gained by attaching a vertical member to provide the desired clearance, as shown in FIG. 5 of the appendix to the provisional application. Alternatively a beam 20 may decline in height in order to put the condenser 1 closer to grade. Or, rather than a beam 20 that slopes downward, the height may be reduced by attaching a vertical offset beam member 28 or plate 37 to provide the desired clearance.

FIG. 8 illustrates an embodiment of a condenser support assembly and system 10 organized in the form of a kit 13 for space-efficient shipping. While in other embodiments the frame 50 may be made of members that are assembled in the field (to decrease shipping cost), this embodiment provides a prefabricated frame 50 to ease installation and facilitate greater reliability and durability. In most cases, the non-frame parts of the kit 13 will fit within the perimeter of the frame 50, and the packed kit 13 will take about the same amount of space as a standard 2" to 4" equipment pad. Therefore, pallet and warehousing requirements will be similar to current industry expectations. In FIG. 8, the beam 20 is shown welded to the sleeve 30, with a grommet 92 in place.

Other items may be added to the kit 13, such as grating 62, decorative pieces, locks, and anti-theft bars. Kit items may be made of steel, aluminum, wood, polymers, rubber, carbon, graphite, or any other material or combination of materials.

FIGS. 9 and 10 illustrate a configuration of a square tube sleeve 30 for a condenser support assembly and system 10, configured and dimensioned as appropriate for a given installation. In one version, the sleeve 30 is 8" to 12" long for block walls 5 or monolithic walls or foundations 3. In another version, the sleeve 30 is 4" to 6" long for framed walls 8. For framed walls 8, a top opening (not shown) would allow the line set 90 to be turned upward into the wall cavity 9 during routing (see FIGS. 2 and 3). The flat slot or channel 32 illustrated toward the top back of the sleeve 30 accommodates a horizontal stabilizing bar 25 when placed between courses of cinder block during new construction. Alternatively, the narrow recesses or channels 33 illustrated toward the top back of the sleeve 30 accommodate a horizontal stabilizing bar 25 when its flat side is placed against the back of the cinder block 7 during a retrofit. In either case, the bar 25 may be mated with anti-vibration material to keep vibration from passing from the sleeve 30 to the wall. The sleeve 30 opening to the outdoors may be insulated 95 to keep rain out. The beam 20 is made of two pieces of angle iron 98 welded to the sleeve 30. It is envisioned that C-channel, pipe, or a variety of other configurations may be used for the beam 20.

FIG. 11 illustrates a configuration of a round pipe sleeve 30 for a condenser support assembly and system 10, configured and dimensioned as appropriate for a given installation. In one version, the sleeve 30 is 8" to 12" long for block walls 5 or monolithic walls or foundations 3. In another version, the sleeve 30 is 4" to 6" long for framed walls 8. For framed walls 8, a top opening (not shown) would allow the line set 90 to be turned upward into the wall cavity 9 during routing (see FIGS. 2 and 3). The flat recess or channel 32 illustrated toward the top back of the sleeve 30 accommodates a horizontal stabilizing bar 25 (not shown) when placed between courses of cinder block during new construction. Alternatively, the narrow recesses or channels 33 illustrated toward the top back of the sleeve 30 accommodate a horizontal stabilizing bar 25 when its flat side is placed against the back of the cinder block 7 during a retrofit. In either case, the bar 25 may be mated with anti-vibration materials to keep vibration from passing from the sleeve 30 to the wall. The sleeve 30 opening to the outdoors may also be insulated (not shown) to keep rain out. The beam 20 is made of pipe smaller in diameter than the sleeve 30 and is welded to the sleeve 30 via an offset plate 37, which is a type of offset beam member 28. Thus, the sleeve 30, plate 37, and beam 20 comprise one support beam 20. It is envisioned that a variety of other materials and configurations may be used for the beam 20.

FIG. 12 is the front view of an offset plate 37 that allows a contractor to install a beam 20 (as shown in FIGS. 11 and 3) at different heights as needed in the field. The larger hole 38 is the sleeve 30, with insulation 95. A beam 20 may be placed through one of the other holes 39 and installed above or below the sleeve 30. Such a plate 37 may be one of numerous sizes, shapes, and materials. It is also envisioned that beams 20 may be installed from the back of the wall through to the front rather than from front to back only.

FIG. 13 is a round sleeve 30 cast inside a block 6. The block 6 may be any material, size, or shape, including a half CMU. The sleeve 30 may be insulated by anti-vibration material such as a rubber sleeve 30 or grommets 92, or any other vibration isolation method. The sleeve 30 may be placed in the center of the block 6 or in any other position that facilitates its function. A beam 20 may be coupled to the sleeve 30 by attaching to the front portion of the sleeve 30 or by inserting the beam 20 into the sleeve 30.

FIG. 14 is a block 6 cast with a square sleeve 30 in place. The block 6 may be any material, size, or shape. The sleeve 30 shown does not have a top line set 90 opening, but it may contain that opening, or no openings (such as the notches for securing the bar 25). The bar 25 may be attached to the sleeve 30 and embedded in the middle of the block 6. The sleeve 30 may be placed in the center of the block 6 or in any other position that facilitates its function. Additionally, the sleeve 30 may be insulated by anti-vibration material and may contain an insulating gasket 95. A beam 20 may be coupled to the sleeve 30 by attaching to the front portion of the sleeve 30 or by inserting the beam 20 into the sleeve 30.

FIG. 15 is the top view of a sleeve 30 placed in a cinder block 7 during new construction. The flat stabilizing bar 25 is laid across the sleeve 30 and mortared in place. The bar 25 may be mechanically attached or welded to the sleeve 30, which may be round or square.

FIG. 16 is the front view of the same installation shown in FIG. 15, with a square sleeve 30. The sleeve 30 and/or bar may be formed with the block 7.

FIG. 17 is a top view of a sleeve 30 installed in cinder block 7 during new construction or a retrofit. The flat bar 25 is installed behind the block 7 and attached to the wall 5, locking the sleeve 30 in place. The sleeve 30 may be round or square. In some embodiments, the sleeve 30 or bar 25 may be secured to joists (not shown) under the building.

FIG. 18 is a front view of the installation in FIG. 17, with a square sleeve 30. The bar 25 may have holes 27 or other features to aid mechanical or other fastening to the wall. Likewise, the bar 25 may have design features that aid interaction and/or attachment with the sleeve 30. The bar 25 also aids in assuring a level installation.

FIGS. 19-21 illustrate a locking plate 70 used to hold a sleeve 30 and condenser support assembly and system 10 in place in the wall. The front and back ends 74 of the plate 70 are bent to overlap the edges of the cinder block or framing. The latch 75 is spring-loaded, or constructed with a similar end in mind, such that a beam 20 or sleeve 30 may push past the latch 75 but may not be withdrawn. Alternately, the spring-loaded latch 75 may be replaced by a simple, angled metal tab 81, as shown in FIG. 23, punched from the steel plate. The beam 20 or sleeve 30 would have a corresponding receptacle 34 for the latch 75 or tab 81, as in FIG. 21. The latch 75 may move side-to-side to fit the hollow section of the cinder block 7. Each sleeve 30 is likely to use two locking plates 70, such that the locking plates 70 may serve the purpose of an outer sleeve.

FIG. 20 shows how one locking plate 70 might fit a cinder block 7. Although the plate 70 illustrated is rectilinear, the plate 70 may be curved to better fit a round sleeve 30. After the hole (not shown) in the block 7 is drilled, a lower locking plate 70 is placed into the bottom of the hole. The front portion 72 of this plate will carry the downward pressure of the support assembly and system 10 and condenser 1 and protect the concrete block 7. A top locking plate 70 is then put in place and held while the beam 20 or sleeve 30 is inserted between the two. The beam 20 or sleeve 30 locks in place between the two plates 70, and the beam 20 or sleeve 30 and plates 70 may not be removed from the wall (unless a release mechanism, not shown, is incorporated). The rear portion 73 of the top plate 70 will carry the upward pressure of the support assembly and system 10 and condenser 1 and protect the concrete block 7.

The locking plates 70 may be fitted with anti-vibration materials. In keeping with the forces at work on the plates 70, with downward pressure at the front of the wall or foundation and upward pressure at the rear, the anti-vibration material may be thicker at those pressure points.

If a locking plate 70 is not used, metal liners may be used to protect the edges of the holes in the cinder block 7, in similar fashion to the protection afforded by the locking plates 70. These liners may be shaped to be a part of or complement rubber grommets 92.

Just as the spring-loaded locking plate 70 makes use of the cavities in cinder blocks 7, other embodiments (not shown) may make use of the cavities for unique anti-vibration solutions.

FIG. 23 is a rear perspective illustration of a sleeve 80 for use with stick-built framing, as shown in FIG. 22, which is a front view of a sill plate 93 and vertical studs 94. The sleeve may be square or round. In some embodiments, the sleeve 80 acts as an outer sleeve to a sleeve 30. In other embodiments, the sleeve 80 acts as the sole sleeve 30 of a beam 20.

The sleeve 80 is approximately 3¼" wide, 3¼" high, and from 4" to 6" deep. The sleeve 80 may be formed from square pipe, such that punched out flanges are used for mechanical anchoring. Alternatively, some anchoring flanges may be welded in place. The sleeve 80 is placed against framing members such that its lower anchoring flange 82 contacts a horizontal framing member, such as a sill plate 93, and its upper anchoring flange 83 contacts a vertical framing member 94. The two smaller flanges are attached behind those respective framing members to help prevent the sleeve 80 and beam 20 from pulling outward from the wall. When a beam 20 is slid inside the sleeve 80, one or more locking tabs engage the beam to prevent slippage or theft. Alternatively, an offset beam member 28 or plate 37 and/or beam 20 may be formed as one beam 20 with the sleeve 80 prior to installation. Alternatively, it is envisioned that the beam 20 may install from back (inside the structure) to front rather than front to back. Typically, after the line set 90 runs through a portion of the beam 20 and into the sleeve 80, it turns upward through the top hole and into the wall cavity 9.

Another configuration of this sleeve 80 is one in which the upper anchoring flange 83 is moved to the side opposite the existing lower anchoring flange 82, such that both flanges are in the same plane. This sleeve 80 may be installed horizontally or vertically against a framing member; a related configuration is shown in FIG. 6 of the appendix to the provisional application. The sleeve 80 may be any other size or shape necessary to provide structural support for the beam 20, frame 50, and condensing unit 1.

The condensing unit 1 may be supported relatively far above grade. Such a scenario is most likely with mini-split units 1, in which case the sleeve 30 may be formed as part of the mounting plate used to hang the air handler 92 on the interior of the building's living space. Thus, the condenser 1 would be suspended directly behind the indoor component some distance up the exterior wall.

FIG. 24 is a rectangular frame 50 and beam 20 formed by bending two pieces of angle iron 98 and joining them such that they create a center support beam 52. Alternatively, a similar frame 50 may be formed by bending one continuous piece of angle iron 98 (not shown). This frame 50 and beam 20 may be connected directly to the sleeve 30 or may be inserted into the wall and act as the sleeve 30 as well as the beam 20. The beam 20 is open underneath so that a line set 90 may pass through the wall. The various means of vibration isolation and stabilization versus rotational forces still apply.

Round or square tube may be used in place of the angle iron 98 used in FIG. 24. If round tube is used, the ends may be crimped to square them up to fit a square sleeve 30.

In one embodiment (not shown), the beam 20 and frame 50 support the pallet upon which the condensing unit 1 ships. In a similar embodiment (not shown), the beam 20 is adapted to support the pallet upon which the condensing unit 1 is shipped, such that the pallet acts as the frame 50. In another embodiment (not shown), a pallet may transform from pallet into a full or partial sleeve 30, beam 20, frame 50, and legs 99 assembly. Larger units 1, such as package units 1, often ship on metal pallet frames, and these embodiments make use of that existing structural element to aid installation and reduce costs.

FIG. 25 is a top view of a frame 50 covered by a metal grating 62 with a beam 20 passing through the wall structure or foundation at an acute or diagonal angle. The main frame beam 61 of the frame 50 is a diagonal beam that attaches to the beam 20. All of these beam components may be formed as one beam initially or be attached to form one beam 20 in the field. The refrigerant stubs 91 near the corner where the beam 20 and main frame beam 61 join are typically made of copper, as is the line set 90. The straight line from the stubs 91 through the wall allow a technician to install the line sets 90 with minimal bending or welding of elbows, saving labor.

Grating 62 may provide both structural support and a decorative finish to any frame 50 contemplated herein. Grating 62 may be of a variety of materials, including metals, polymers, and composites, and of any size and shape desired. Although not shown, other decorative pieces that might attach to and or cover parts of the frame 50, beams 20, offset beam 28 or offset plate 37, sleeve 30, or any connections or joints are foreseen. These decorative pieces may also be of a wide variety of materials, including metals, polymers, and composites, sizes, and shapes.

FIG. 26 is a top view of an adjustable square frame 65. The frame 65 may also be rectangular or of other shapes. Larger pipes, tubes, or channel hold smaller pipes, tubes, channel, or angle iron 98. As the diagonal telescoping frame beam 66 is drawn in, the side beams 67 of the frame 65 also reduce in length, allowing one frame 65 to range from about 21" to 42" on each side. A crossing beam 63 may be added for additional strength and stability. The majority of the main frame beam 61 within the frame 65 is in the same plane as the frame side members 67. The beam 20 attaches under the corner of the frame 65 and main frame beam 61.

In any embodiment or configuration, the beam 20 may meet the frame 50 within the same plane, under the frame 50, or above the frame 50.

Other configurations of adjustable frames 65 or frames 50 converted from one configuration to another are contemplated.

FIG. 27 is a top view of a condenser support assembly and system 10 with diagonal frame beam 61 and beam 20 that runs to the structure wall at 45 degrees and then turns perpendicular to the wall 5 as the sleeve 30 passes through the wall. A central beam support 64 is added in the event that a technician needs to either install through a centrally located sleeve 30 or install extra support to prevent rotation of the sleeve 30 and diagonal beam 20. The footprint 2 of the unit 1 is indicated. In practice, the line set 90 and wiring is run directly from the refrigerant stubs 91 at the corner of the unit 1 through the sleeve 30 with a minimal number of bends or welded elbows.

FIG. 28 is an illustration of a configuration of a condenser support assembly and system 10 in which a double sleeve 31 may be cast within a concrete block 7, preferably with a metal stabilizing bar 25 or rod connecting the two sleeves 30. Each sleeve 30 in the double sleeve 31 may attach to a beam 20 or receive a beam 20 or sleeve 30. In the latter case, the double sleeve 31 functions as an outer sleeve 30. A beam 20 may incorporate a sleeve 30 and may be joined to a secondary support beam 21 that helps resist rotational forces. The supporting beam 21 may also act as a sleeve 30, although only one line set opening typically is necessary. This configuration will accommodate a variety of block depths and wall sidings, such as plain block, vinyl, or brick. In practice, the beam and support beam are inserted into the double sleeve 31; the line set 90 and electrical wiring may pass through an opening in the beam 20 and through both the first sleeve 30 and the secondary double sleeve 31 in the block, thus passing through the completed beam 20. The additional supporting beam 21 may attach to the main beam 20 in the same plane as the beam 20 or under or above the beam 20. The additional supporting beam 21 may attach to the beam 20 by welding, mechanical fasteners, or use of an end ring (not shown) to slide onto the beam 20. A variety of means of attachment, as well as orientation of these parts, are anticipated. Any material may be used for any component provided it is structurally suitable.

FIG. 29 is an illustration of a double sleeve 31 cast in a monolithic wall or foundation 3, including a slab on grade.

FIG. 30 is an illustration of a double sleeve 31 formed as part of a metal block 86. The faces 87 of the block 86 that connect with the sleeves 31 act as the stabilizing "bars" 25, and concrete may be poured into the block 86 as with standard concrete blocks. This block 86 may be formed from a template 88 such as FIG. 31, in which the dashed lines represent folds. Standard block 86 is nominal 8"×8"×16". Actual dimensions are 7⅝"×7⅝"×15⅝". Other sizes include 8"×4"× 16" and an unconventional 8"×8"×33" (for installation of multiple sleeves and beams), as well as other sizes of CMUs. Faces 87 of the metal block 86 may be corrugated for strength, and abutting edges may be welded or not welded. The metal may be of different types and thicknesses, and the block 86 may be formed by stamping, roll forming, bending, welding, or other methods. The metal block 86 may contain anchoring plates (not shown) to assist anchoring the metal block 86 to surrounding concrete blocks in order to prevent movement and theft. The metal block 86 may contain one sleeve 30 only or one or more holes rather than sleeves 30. The holes and sleeves 30 may also be square, round, or any other shape. It is envisioned that the metal block 86 may be formed and shaped in a number of ways. The same is true of a sleeve or sleeves 30 formed in concrete blocks 7.

A sleeve or sleeves 30 in a concrete block 7 or metal block 86 may be in any position within the block. In one configuration, as in FIG. 31, blocks with holes that have centers 3" from the top of the block may be flipped vertically so that when installed the holes have centers 5" from the top of the block, and vice versa. In this fashion, installers may make some correction for the relationship of the sleeves 30 to the grade level next to the wall.

FIG. 32 is the top view of a preferred embodiment of a reversible condenser support assembly and system 10 with a secondary support beam 21. The beam 20 may be installed extending diagonally left, or the beam 20 may be installed extending diagonally right. The same support assembly and system 10 may be used in either position. In practice, dual sleeves 31 in a block 86 receive the sleeve 30 and beam 20 with supporting beam 21, which are placed with mounting plates 29 flush against the block face 87. From the back of the block, additional mounting plates 29 are placed flush against the block back 87. These plates 29 may be large, threaded nuts, and portions of the beams 20 and sleeves 30 may be threaded to receive them. The plates 29 and sleeves 30 may be lined with vibration dampening material. All parts are tightened in place, and the back plates 29 may be joined by a bar 25 and/or tie-down strap 24 so that they do not rotate. The bar 25 and/or tie-down strap 24 may incorporate an attachment for a piece of lumber 23 or other material to be tied from the condenser support assembly and system 10 to the substructure of the building.

It is envisioned that a variety of means may be used to stabilize the beams 20 against rotational forces, as discussed in other configurations. It is also envisioned that openings for the line set 90 to pass through the sleeves 30 and beams 20 may be located and sized in a variety of ways that allow for reversible installations. Alternatively, parts may be formed so that they do not allow convenient reversal.

FIG. 33 is a top view of a two-condenser support assembly and system 10 using a metal block 86 with dual sleeves 31 behind a brick veneer 56. The double sleeves 31 formed in the block 86 have standoff collars 35 added to aid the masons in their work. The additional supporting beam 21 is moved to a central position joining the two beams 20, and the entire subassembly is placed into the dual sleeves 31 for final assembly. Flanges, plates, or nuts 29 are tightened against the wall on both sides, and a bar 25 or tie-down strap 24 is attached to the back flanges, plates, or nuts 29. Anti-vibration and insulation materials are incorporated as required. It is envisioned that other configurations may be used to achieve a two-unit installation, with or without beam parts that are reversible.

FIG. 34 is a bottom view of an alternative configuration of a reversible condenser support assembly and system 10, one that makes use of a beam coupler 76. An interiorly threaded beam coupler 76 is provided to couple an externally threaded first sleeve 30, set within a metal block 86, to an externally threaded end of a primary support beam 20. A secondary support beam 21 is joined to the primary support beam 20. In practice, the secondary support beam 21 is first placed into a second sleeve 30 in the block 86. Next, the beam coupler 76 is threaded onto both the beam 20 and the first sleeve 30 in the block 86 at the same time. In this manner, the beam 20 is secured to the block 86 and the beam 20, coupler 76, and sleeve 30 are made one beam 20. The plate or nut 29 behind the block 86 is tightened on the secondary support beam 21 for stability and theft prevention. The beam coupler 76 is oriented so that its line set opening 77 faces downward in order to prevent entry of rain. The threaded sleeve or sleeves 30 may be insulated. Parts may be protected against vibration as necessary. Threading may be reversed such that the beam coupler 76 is externally threaded.

FIG. 35 is a top view of a two-unit condenser supporting system 10 with frames 50 and line sets 90 illustrated. Both line sets 90 may run from their respective copper stubs through one beam 20 and sleeve 30 or through separate beams 20 and sleeves 30. A double sleeve 31 is shown, such that each line set 90 passes through two sleeves 30 and 31. However, the two-unit system may be installed without the double sleeve 31. The diagonal beams 20 stabilize each other and ensure adequate spacing around the equipment for airflow and service. The spacing between the back of each unit 1 and the wall is typically up to 12 inches, unless less for equipment such as mini-splits. The spacing between units 1 is 24" to 36" to meet manufacturer recommendations and electrical servicing codes.

In one embodiment (not shown), collars may be placed around the beam 20, each collar anchoring anti-theft bars that wrap around the equipment unit; the combination of these bars with other anti-theft materials protects the unit from copper theft. The bars may be moved for unit service.

Although the foregoing specific details describe various embodiments and configurations of the invention, persons reasonably skilled in the art will recognize that various changes may be made in the details of the apparatus of this invention without departing from the spirit and scope of the invention as defined in the appended claims.

The present invention includes several independently meritorious inventive aspects and advantages. Unless compelled by the claim language itself, the claims should not be construed to be limited to any particular set of drawings, as it is contemplated that each of the drawings may incorporate features shown in others of the drawings.

I claim:

1. A sleeve, beam and frame system for coupling a condensing unit to a wall or foundation of a structure and supporting the condensing unit above ground, the system comprising:
   a main support beam;
   a frame configured to be mounted to the main support beam, the frame configured to support the condensing unit;
   a sleeve configured to be mounted in the structural wall or foundation and mated to the main support beam; and
   a stabilizing member mounted inside or on a face of the structural wall or foundation, the stabilizing member coupled to the sleeve and/or beam to resist rotation of the sleeve, beam and frame system;
   the sleeve, beam, and frame system configured to be secured to the wall or foundation to interfere with removal of the system,
   the main support beam adapted to allow a line set from the condensing unit to pass through at least a portion of the interior of the main support beam into the sleeve; and
   the sleeve adapted to allow the line set to exit from the sleeve into the structure.

2. A sleeve, beam and frame system for coupling a condensing unit to a wall or foundation of a structure and supporting the condensing unit above ground, the system comprising:
   a main support beam;
   a frame configured to be mounted to the main support beam, the frame configured to support the condensing unit; and
   a sleeve configured to be mounted in the structural wall or foundation and mated to the main support beam;
   the main support beam adapted to allow a line set from the condensing unit to pass through at least a portion of the interior of the main support beam into the sleeve;
   the sleeve adapted to allow the line set to exit from the sleeve into the structure; and
   the main support beam configured to extend diagonally outward and away from the structural wall or foundation.

3. The sleeve, beam and frame system of claim 1, wherein a sleeve is preformed as part of a wall block that is configured to receive cementitious material.

4. A sleeve, beam and frame system for coupling a condensing unit to a wall or foundation of a structure and supporting the condensing unit above ground, the system comprising:
   a main support beam;
   a frame configured to be mounted to the main support beam, the frame configured to support the condensing unit;
   a sleeve configured to be mounted in the structural wall or foundation and mated to the main support beam; and
   a template configured to be folded into a wall block that supports the sleeve;
   the main support beam adapted to allow a line set from the condensing unit to pass through at least a portion of the interior of the main support beam into the sleeve; and the sleeve adapted to allow the line set to exit from the sleeve into the structure.

5. The sleeve, beam and frame system of claim 1, further comprising a second support beam configured to be mounted into the structural wall or foundation and mated to support the main support beam.

6. A sleeve, beam and frame system for coupling a condensing unit to a wall or foundation of a structure and supporting the condensing unit above ground, the system comprising:
   a main support beam, the main support beam including a vertical offset member that couples two horizontal members;
   a frame configured to be mounted to the main support beam, the frame configured to support the condensing unit; and
   a sleeve configured to be mounted in the structural wall or foundation and mated to the main support beam;
   the main support beam adapted to allow a line set from the condensing unit to pass through at least a portion of the interior of the main support beam into the sleeve; and
   the sleeve adapted to allow the line set to exit from the sleeve into the structure.

7. The sleeve, beam and frame system of claim 1, wherein the sleeve and main support beam are formed as one piece.

8. A sleeve, beam and frame system for coupling a condensing unit to a wall or foundation of a structure and supporting the condensing unit above ground, the system comprising:
   a main support beam;
   a frame configured to be mounted to the main support beam, the frame configured to support the condensing unit;
   a sleeve configured to be mounted in the structural wall or foundation and mated to the main support beam; and
   adjustable-length legs configured to descend from the frame to the ground to provide additional support to the sleeve, beam and frame system;
   the main support beam adapted to allow a line set from the condensing unit to pass through at least a portion of the interior of the main support beam into the sleeve; and
   the sleeve adapted to allow the line set to exit from the sleeve into the structure.

9. The sleeve, beam and frame system of claim 7, further comprising a second, outer sleeve configured to be anchored inside the wall or foundation, to accept the combined first sleeve and support beam, and to allow the line set to pass out of both sleeves and into the wall or foundation.

10. The sleeve, beam and frame system of claim 1, wherein the sleeve, beam and frame system is a cantilevered structure that fully supports the condensing unit above the ground.

11. The sleeve, beam and frame system of claim 2, wherein the sleeve and main support beam are formed as one piece.

12. The sleeve, beam and frame system of claim 4, wherein the sleeve and main support beam are formed as one piece.

13. The sleeve, beam and frame system of claim 6, wherein the sleeve and main support beam are formed as one piece.

14. The sleeve, beam and frame system of claim 8, wherein the sleeve and main support beam are formed as one piece.

* * * * *